United States Patent [19]

Phillips et al.

[11] Patent Number: 5,359,718
[45] Date of Patent: Oct. 25, 1994

[54] EARLY SCALABLE INSTRUCTION SET MACHINE ALU STATUS PREDICTION APPARATUS

[75] Inventors: James E. Phillips, Binghamton; Stamatis Vassiliadis, Vestal, both of N.Y.

[73] Assignee: International Business Machines Corporation, Armonk, N.Y.

[21] Appl. No.: 677,692

[22] Filed: Mar. 29, 1991

[51] Int. Cl.$^5$ .......................... G06F 7/38; G06F 7/50
[52] U.S. Cl. ..................... 395/375; 364/736; 364/DIG. 1; 364/263.1; 364/262.4
[58] Field of Search ................. 364/736; 395/375, 800

[56] References Cited

U.S. PATENT DOCUMENTS

| | | | |
|---|---|---|---|
| 3,758,760 | 9/1973 | Cowan | 364/738 |
| 3,983,382 | 9/1976 | Weinberger . | |
| 4,016,545 | 4/1977 | Lipouski | 395/800 |
| 4,247,893 | 1/1981 | Anderson et al. | 395/425 |
| 4,319,335 | 3/1982 | Rubinfield . | |
| 4,439,828 | 3/1984 | Martin | 395/375 |
| 4,467,444 | 8/1984 | Harmon, Jr. et al. | 364/736 |
| 4,594,655 | 6/1986 | Hao et al. | 364/736 |
| 4,754,412 | 6/1988 | Deering | 364/736 |
| 4,811,268 | 3/1989 | Nishitani et al. | 364/736 |
| 4,819,155 | 4/1989 | Wulf et al. | 395/375 |
| 4,852,040 | 4/1989 | Oota | 364/768 |
| 4,924,422 | 5/1990 | Vassiliadis et al. | 364/715.09 |
| 4,947,359 | 8/1990 | Vassiliadis et al. | 364/715.09 |

FOREIGN PATENT DOCUMENTS 0118830 9/1984 European Pat. Off. .
0328871 8/1989 European Pat. Off. .

OTHER PUBLICATIONS

Acosta, R. D., et al. "An Instruction Issuing Approach to Enhancing Performance in Multiple Functional Unit Processors", IEEE Transactions on Computers, Fall, C-35 No. 9, Sep. 1986, pp. 815-828.

Anderson, V. W., et al,. the IBM System/360 Model 91: "Machine Philosophy and Instruction Handling", computer structures: Principles and Examples (Siewiorek, et al, ed (McGraw-Hill, 1982) pp. 276-292.

Capozzi, A. J., et al. "Non-Sequential High-Performance Processing" IBM Technical Disclosure Bulletin, vol. 27, No. 5, Oct. 1984, pp. 2842-2844.

Chan, S., et al, "Building Parallelism into the Instruction Pipeline", High Performance Systems, Dec. 1989, pp. 53-60.

Murakami, K. et al. "SIMP (Single Instruction Stream/Multiple Instruction Pipelining); A Novel High-Speed Single Processor Architecture" Proceedings of the Sixteenth Annual Symposium on Computer Architecture, 1989, pp. 78-85.

(List continued on next page.)

Primary Examiner—Parshuiam S. Lall
Assistant Examiner—Richard Lee Ellis
Attorney, Agent, or Firm—Lynn L. Augspurger

[57] ABSTRACT

An apparatus implementing an algorithm for generating carries due to the second instruction of an interlocked instruction pair when executing all combinations of logical as well as arithmetic instruction pairs is developed. The algorithm is then applied to three interlock collapsing ALU means implementations that have been proposed. The critical path for calculating the carries is first presented. Next the expression for generating these carries is used to derive a fast implementation for generating overflow which is implemented in the apparatus. The resulting ALU status determination apparatus includes a three-to-one ALU means for executing plural instructions which can predict the status of three-to-one ALU operations related to the presence/absence of carries incorporated in the three-to-one ALU designed to execute a second instruction of a pair of instructions in parallel and whether or not the second instruction of the pair is independent or dependent on the result of the operation of the first instruction. Additionally, an implementation scheme for predicting result equal to zero is developed for the three-to-one ALU operations.

24 Claims, 8 Drawing Sheets

OTHER PUBLICATIONS

Smith, J. E., "Dynamic Instructions Scheduling and the Astronautics ZS-1", IEEE Computer, Jul. 1989, pp. 21-35.

Smith, M.D., et al, "Limits on Multiple Instruction Issue", ASPLOS III, 1989, pp. 290-302.

Tomasulo, R. M., "An Efficient Algorithm for Exploiting Multiple Arithmetic Units", Computer Structures, Principles and Examples (Siewiorek, et al ed), McGraw-Hill, 1982, pp. 293-302.

Wulf, P.S. "The WM Computer Architecture" Computer Architecture News, vol. 16, No. 1, Mar. 1988, pp. 70-84.

Jouppi, N. P., et al, "Available Instruction-Level Parallelism for Superscalar Pipelined Machines", ASPOLS III, 1989, pp. 272-282.

Jouppi, N. P., "The Non-Uniform Distribution of Instruction-Level and Machine Parallelism and its Effect on Performance", IEEE Transactions on Computers, vol. 38, No. 12, Dec. 1989, pp. 1645-1658.

Ryan, D. E., "Entails 80960: An Architecture Optimized for Embedded Control", IEEE Microcomputers, vol. 8, No. 3, Jun. 1988, pp. 63-76.

Colwell, R. P., et al, "A VLIW Architecture for a Trace Scheduling Compiler", IEEE Transactions on Computers, vol. 37, No. 8, Aug. 1988, pp. 967-979.

Fisher, J. A., "The VLIW Machine: A Multi-Processor for Compiling Scientific Code", IEEE Computer, Jul. 1984, pp. 45-53.

Berenbaum, A. D., "Introduction to the CRISP Instruction Set Architecture", Proceedings of Compcon, Spring, 1987, pp. 86-89.

Bandyopadhyay, S., et al, "Compiling for the CRISP Microprocessor", Proceedings of Compcon, Spring 1987, pp. 96-100.

Hennessy, J., et al, "MIPS: A VSI Processor Architecture", Proceedings of the CMU Conference on VLSI Systems and Computations, 1981, pp. 337-346.

Patterson, E. A., "Reduced Instruction Set Computers", Communications of the ACM, vol. 28, No. 1, Jan. 1985, pp. 8-21.

Radin, G., "801 Mini-Computer", IBM Journal of Research and Development, vol. 27, No. 3, May 1983, pp. 237-246.

Ditzel, D. R., et al, "Branch Folding in the CRISP Microprocessor: Reducing Branch Delay to Zero", Proceedings of Compcon, Spring 1987, pp. 2-9.

Hwu, W. W., et al, "Checkpoint Repair for High-Performance Out-of-Order Execution Machines", IEEE Transactions on Computers vol. C36, No. 12, Dec. 1987, pp. 1496-1594.

Lee, J. K. F., et al, "Branch Prediction Strategies in Branch Target Buffer Design", IEEE Computer, vol. 17, No. 1, Jan. 1984, pp. 6-22.

Riseman, E. M., "The Inhibition of Potential Parallelism by Conditional Jumps", IEEE Transactions on Computers, Dec. 1972, pp. 1405-1411.

Smith, J. E., "A Study of Branch Prediction Strategies", IEEE Proceedings of the Eight Annual Symposim on Computer Architecture, May 1981, pp. 135-148.

Archibold, James, et al, Cache Coherence Protocols: "Evaluation Using a Multiprocessor Simulation Model", ACM Transactions on Computer Systems, vol. 4, No. 4, Nov. 1986, pp. 273-398.

Baer, J. L., et al "Multi-Level Cache Hierarchies: Organizations, Protocols, and Performance" Journal of Parallel and Distributed Computing vol. 6, 1989, pp. 451-476.

Smith, A. J., "Cache Memories", Computing Surveys, vol. 14, No. 3, Sep. 1982, pp. 473-530.

Smith, J.E., et al, "A Study of Instruction Cache Organizations and Replacement Policies", IEEE Proceedings of the Tenth Annual International Symposium on Computer Architecture, Jun. 1983, pp. 132-137.

Vassiliadis, S., et al, "Condition Code Predictor for Fixed-Arithmetic Units", International Journal of Electronics, vol. 66, No. 6, 1989, pp. 887-890.

Tucker, S. G., "The IBM 3090 System: An Overview", IBM Systems Journal, vol. 25, No. 1, 1986, pp. 4-19.

IBM Publication No. SA22-7200-0, Principles of Operation, IBM Enterprise Systems Architecture/370, 1988.

The Architecture of Pipelined Computers, by Peter M. Kogge Hemisphere Publishing Corporation, 1981.

IBM Technical Disclosure Bulletin (vol. 33 No. 10A, Mar. 1991), by R. J. Eberhard.

Patent Abstracts of Japan, vol. 5, No. 169 (P-086), Oct. 28, 1981, JP-A-56096328, Apr. 8, 1981.

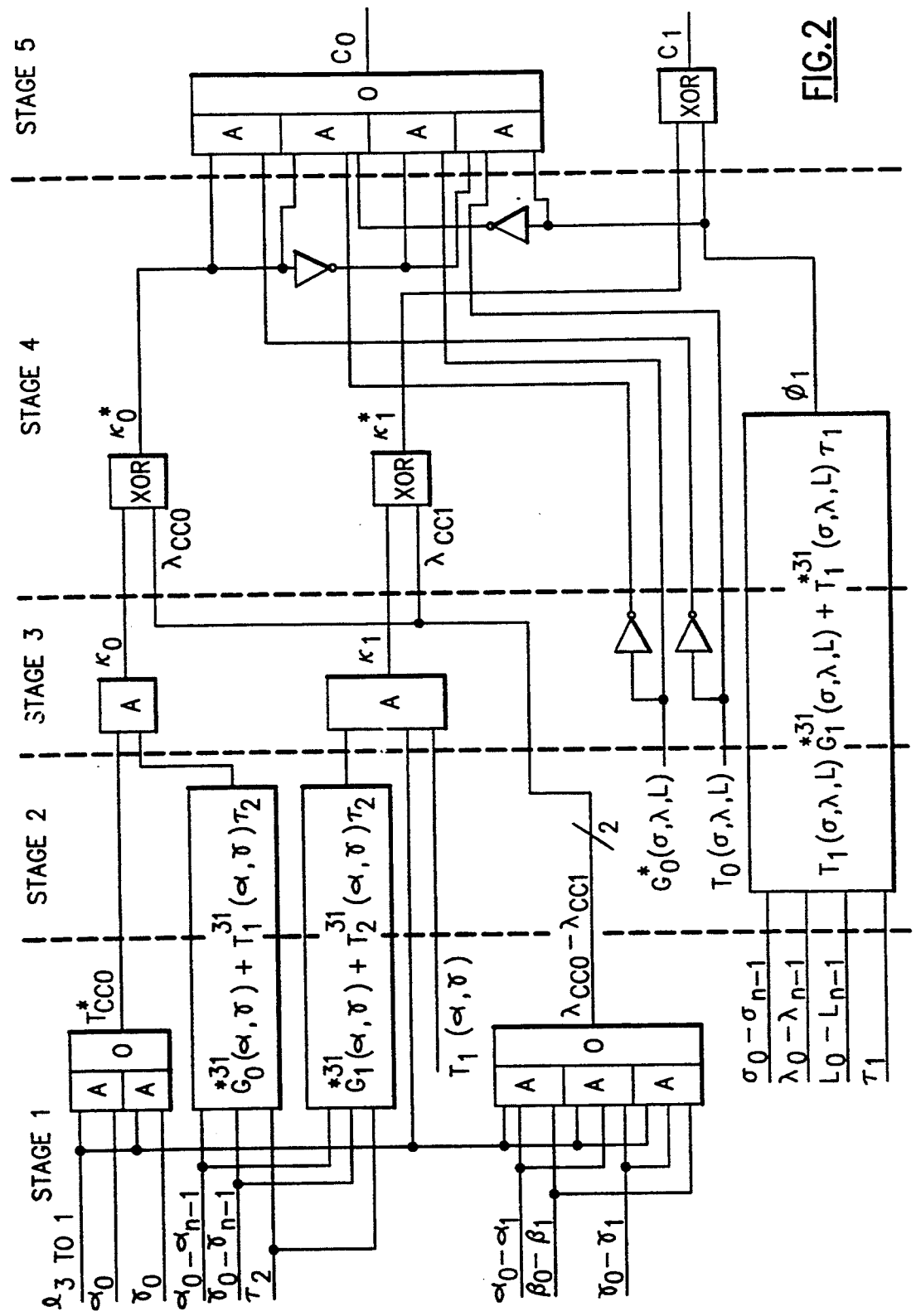

EARLY SCALABLE INSTRUCTION SET MACHINE ALU STATUS PREDICTION APPARATUS

RELATED APPLICATIONS

This application claims priority and is to be treated as a continuation in part of the following applications:

(1) application Ser. No. 07/504,910, filed Apr. 4, 1990, now U.S. Pat. No. 5,051,940, granted Sep. 24, 1991, entitled "Data Dependency Collapsing Hardware Apparatus", the inventors being Stamatis Vassiliadis et al.;

(2) application Ser. No. 07/619,868 filed Nov. 28, 1990, now U.S. Pat. No. 5,301,341, entitled "Overflow Determination for Three-Operand ALUs in a Scalable Compound Instruction Set Machine", the inventors being Stamatis Vassiliadis et al.;

This application relates to subject matter disclosed in:

(3) application Ser. No. 07/677,079, filed Mar. 29, 1991 now U.S. Pat. No. 5,299,319, entitled "High Performance Interlock Collapsing ALU Apparatus", the inventors being Stamatis Vassiliadis et al., filed concurrently herewith.

Furthermore, the subject matter of this application, while having other applications and uses, may be used in connection with a Scalable Compound Instruction Set Machine (SCISM) as defined by the following additional applications:

(1) application Ser. No. 07/519,382, filed May 4, 1990, entitled "Scalable Compound Instruction Set Machine Architecture", the inventors being Stamatis Vassiliadis et al., abandoned and now continued as U.S. Ser. No. 08/013,982 filed Feb. 5, 1993;

(2) application Ser. No. 07/519,384, filed May 4, 1990, entitled "General Purpose Compound Apparatus For Instruction-Level Parallel Processors", the inventors being Richard J. Eickemeyer et al., abandoned and now continued as U.S. Ser. No. 08/015,272 filed Feb. 5, 1993;

(3) application Ser. No. 07/522,219, filed May 10, 1990, entitled "Compounding Preprocessor For Cache", the inventors being Bartholomew Blaner et al., now issued as U.S. Pat. No. 5,214,763 granted May 25, 1993;

(4) application Ser. No. 07/543,464, filed Jun. 26, 1990, now abandoned entitled "An In-Memory Preprocessor for a Scalable Compound Instruction Set Machine Processor", the inventors being Richard Eickemeyer et al.;

(5) application Serial No. 07/543,458, filed Jun. 26, 1990, now U.S. Pat. No. 5,197,135 entitled "Memory Management for Scalable Compound Instruction Set Machines With In-Memory Compounding", the inventors being Richard Eickemeyer et al., now issued as U.S. Pat. No 5,197,135 granted Mar. 23, 1993;

(6) application Ser. No. 07/642,011, filed Jan. 15, 1991, now U.S. Pat. No. 5,295,249 entitled "Compounding Preprocessor for Cache", the inventors being Bartholomew Blaner et al.;

(3) application Ser. No. 07/677,066, filed Mar. 29, 1991 now abandoned, entitled "System for Compounding Instructions for an Instruction Processor With Different Attributes With Apparatus for Handling Test and Data With Differing Reference Point Information and Backward Compounding Apparatus for Compound Instructions", the inventors being Richard Eickemeyer et al.; and (3) application Ser. No. 07/677,685, filed Mar. 29, 1991 now U.S. Pat. No. 5,303,356, entitled "System for Preparing Instructions for Instruction Processor and System with Mechanism for Branching in the Middle of a Compound Instruction", the inventors being S. Vassiliadis et al.

These co-pending applications and the present application are owned by one and the same assignee, namely, International Business Machines Corporation of Armonk, N.Y.

FIELD OF THE INVENTION

This invention relates to the field of Arithmetic Logic Units (ALUs), and to a new machine organization which executes pairs of instructions in parallel having "add/logical combinatorial operations" which means combining all four of the following combinations: add-add; add-logical; logical-add; and logical-logical functions, and to a machine organization in which two or more disassociated ALU operations are specified by a single ALU which responds to the parallel issuance of a plurality of separate instructions, each of which specifies ALU operations, and executes the instructions in parallel, and particularly to the prediction of the status for three-to-one arithmetic logic units or ALU's.

BACKGROUND OF THE INVENTIONS

Conventional architectures are scalar, represented by such systems as RISC, IBM System/360 and System/370. In addition there are such devices as have been described in Wulf et al., U.S. Pat. No. 4,819,155 and Oota, U.S. Pat. No. 4,852,040. See also, the article by W. A. Wulf proposed in Computer Architecture News, March, 1988, entitled "The WM Computer Architecture". The Wulf apparatus is for vector processing rather than scalar processing, but teaches two operands are combined in an ALU to produce a result in a first execution cycle, following which the result and a third operand are provide to a second ALU which produces a result in a second execution cycle. This reference hints at pipelining similar to superscalar machines which are known, as one way to improve performance.

Pipelining is a standard technique used by computer designers to improve the performance of computer systems. In pipelining an instruction is partitioned into several steps or stages for which unique hardware is allocated to implement the function assigned to that stage. If the cycle time of an n-stage pipeline implementation is assumed to be m/n, where m is the cycle time of the corresponding implementation not employing pipelining, then the best pipeline implementation will have a cycle time of m/n. Another known technique is super-scalar, which permits instructions, grouped strictly on a first-in-first-out basis to be simultaneously issued. The superscalar machine was not designed for a scalable compound instruction set, where related instructions not necessarily originally written together, may be issued as a plural set unit instruction for execution in parallel.

Parallel execution of instructions has become a popular technique for improving processor performance for a reasonable cost. The invention does not consider the parallel execution of instructions per se as novel, even though parallel execution of base instructions is achieved by the inventions, rather it concerns the prediction of the status of a three-to-one adder. Such an adder may be used in a system which processes instructions in parallel.

It is known to implement a three to one adder. It consists of a three to two carry save adder (CSA) followed by a two to one carry look ahead adder (CLA). S. Vassiliadis and M. Putrino, recognized that the critical path in ALUs is usually limited by determination of result equal to zero. In "Condition code predictor for fixed-point arithmetic units," Int. J. Electronics, vol. 66, no. 6, pp. 887–890, 1989, they proposed a method for predicting that the result is equal to zero for a two-to-one two's complement adder; however, as recognized by the author and one of the joint inventors here, that method does not apply for a three-to-one ALU.

A discussion of one known form of the two-to-one CLA can be found in S. Vassiliadis, "Recursive Equations for Hardware Binary Adders," Int. J. Electronics, vol. 67, no. 2, pp. 201–213, 1989, which discusses hardwired binary adders. This journal article may be referenced for definitions of the known quantities $G_n^x$ and $T_n$, which represent the pseudo-generate and transmit, respectively, at bit position n in the Boolean expressions which we use to describe the stages of the CLA employed in a described preferred embodiment of our inventions. For ease in understanding of our inventions, they have been precisely detailed in Boolean expressions and the booksets described in the description of our preferred embodiments. In the discussion which follow, only the generation of true logic values of a variable are presented in stage by stage delay. These assumptions, however, are not intended to and do not limit the applicability of the discussion and the devices presented since such a bookset is common in currently available technologies and extendable to other technologies having similar characteristics or equivalent functional power within their bookset.

BACKGROUND OF RELATED INVENTIONS

The System/370 sold by International Business Machines which can be made to execute in parallel certain interlocked instructions, and can perform with limitations the requirements of scalable compound instruction set machine as first disclosed in the referenced applications, and there are such suggestions made in other applications as to possibilities which may be used, for example, application Ser. No. 07/642,011 filed Jan. 16, 1991, now U.S. Pat. No. 5,295,249 as other ALUs for a scalable compound instruction set machine. These existing processors have not been publicly used as such, and there has been no publication of the possibility of such a use, but the possibility has been described in some aspects in applications filed after the priority claimed herein.

Further, by way of background the first collapsing ALU was described in application Ser. No. 07/504,910, now U.S. Pat. No. 5,051,940 filed Apr. 4, 1990, entitled "Data Dependency Collapsing Hardware Apparatus", the inventors being Stamatis Vassiliadis et al; and in application Ser. No. 07/619,868, filed Nov. 28, 1990 now U.S. Pat. No. 5,301,341, entitled "Overflow Determination for Three-Operand ALUs in a Scalable Compound Instruction Set Machine", the inventors being Stamatis Vassiliadis et al., from which this application claims priority. It is the object of this invention to provide new devices for Arithmetic Logic Units (ALUs), and devices which are capable of implementation with an architecture which defines instructions that have an "add/logical combinatorial operation" which means combining all four of the following combinations: add-add; add-logical; logical-add; and logical-logical functions, and to an architecture in which two or more disassociated ALU operations are specified by a single interlock collapsing ALU which responds to the parallel issuance of a plurality of separate instructions, each of which specifies ALU operations, and executes the instructions in parallel. Thus a plurality of separate operands as a feature which the present inventions accommodate are passed to the execution unit (ALU) in the same execution cycle, and they may also be passed altogether with a third operand to the execution unit (ALU). Two results are produced and available at the end of a single execution cycle. One of the results may be produced by the first ALU and another single result may be produced by the second ALU.

Thus, in a data dependency collapsing hardware apparatus, will broadly have an instruction device for receiving a plurality of scalar instructions, a first of which produces a result used by the second of the scalar instructions, and there is a device which simultaneously issues a plurality of operands, at least two of which are used by the first and another of the scalar instructions, and the execution unit, under control signals indicating operations which execute the plurality of scalar instructions, produces in a single cycle a single result corresponding to the performance of the operations on the operands. (See U.S. Ser. No. 07/504,910 referenced above for full details of such a proposed apparatus).

The SCISM architecture is applicable not only to 370 architectures, but other architectures, including RISC, where it is desirable to enhance performance of applications which have been developed and which would desirably operate faster if there were parallel issuance and execution of specified plural instructions for an ALU. Such a system enables new hardware to execute old instructions at a more rapid rate, reducing the necessity of reprogramming old programs for a new machine having a new architecture.

The apparatus for which the disclosures of this application are directed is applicable to parallel execution of instructions, and is specifically advantageous in the environment of the related inventions, and to architectures which issue and execute plural instructions in parallel, such as the Scalable Compound Instruction Set Machine architecture which we now call the SCISM architecture.

Less than ideal speedups have been obtained by parallel execution of instructions partially due to data dependencies also known as interlocks. To reduce this performance degradation, due to interlocks, an interlock collapsing ALU has been provided in U.S. Ser. No. 07/504,910, filed Apr. 4, 1990, now U.S. Pat. No. 5,051,940, and an apparatus for handling all "Add/Logical Combinatorial Operations" has been disclosed in the application noted above for a High Performance Collapsing SCISM ALU. The interlock collapsing ALU would be used in conjunction with a conventional two-to-one ALU in a manner in which the first instruction of an interlocked pair would be executed in the conventional ALU at the same time that both instructions are executed simultaneously in the interlock collapsing ALU. If the instruction pair does not possess an interlock, then the interlock collapsing ALU executes the second instruction singularly as the conventional ALU executes the first instruction.

In addition to producing the correct results, ALU's must also accurately report status. This status can include a report of a less than zero, result greater than zero, result equal to zero, and overflow. For the interlock collapsing ALU, this status should be reported as if the second instruction were executed singularly using the results of the first instruction, as provided by U.S. Ser. No. 07/619,868, filed Nov. 28, 1990 now U.S. Pat. No. 5,301,341. ALU status can be determined if the carries into and from the most significant bit (MSB) are known and result equal to zero can be determined. The determination of result equal zero can at worst be made from the result, if no method of predicting the outcome can be found. Generation of result equal zero using this method would be accurate since for proper operation, the result produced from the interlock collapsing ALU must be identical to the result that would be produced via a serial implementation. Therefore, the problem of generating ALU status in the interlock collapsing ALU can be reduced to that of extracting the carries into and from the MSB that are due to the execution of the second instruction. These carries, which are not explicitly produced during the execution of the interlock collapsing ALU, must be extracted from the information generated during the simultaneous execution of the interlocked instruction pair. An algorithm for extracting these carries during three-to-one add/subtract operations has been provided also by U.S. Ser. No. 07/619,868 filed Nov. 28, 1990, now U.S. Pat No. 5,301,341. Three-to-one add/subtract operations arise from collapsing interlocks between two arithmetic instructions. The algorithm is:

$$c_0 = \kappa_0 \veebar \lambda_0 \veebar \phi_0$$

$$c_1 = \kappa_1 \veebar \lambda_1 \veebar \phi_1$$

where $c_0$ and $c_1$ represent the carries due to the execution of the second operation into and from the MSB, $\kappa_0$ and $\kappa_1$ represent the carries that would have been produced during the execution of the first instruction, $\lambda_0$ and $\lambda_1$ represent the carries produced by the carry save adder CSA, and $\phi_0$ and $\phi_1$ represent the carries produced by the carry look-ahead adder CLA used in the three-to-one adder. In this expression, $\veebar$ represents a bitwise EXCLUSIVE-OR operation. Thus, an algorithm that can be implemented is known for extracting $c_0$ and $c_1$ when the first functional category is executed.

Our own work mentioned above can be improved in the following areas:

1. The systems can be made applicable to all functional categories required to be performed by the three-to-one ALU,
2. Even for the categories to which it is applicable, it will produce critical paths that do not extend the cycle time, and
3. Additional elements and functions can be provided to handle all of the intricacies required for controlling the ALU, which had not been handled heretofore; and where by functional categories is meant:

| | |
|---|---|
| $A + B + \Gamma$ | Arithmetic followed by Arithmetic |
| $B + (A \text{ LOP } \Gamma)$ | Logical followed by Arithmetic |
| $B \text{ LOP } (A + \Gamma)$ | Arithmetic followed by Logical |
| $B \text{ LOP } (A \text{ LOP } \Gamma)$. | Logical followed by Logical | and prior work discusses only the arithmetic followed by arithmetic category.

SUMMARY OF THE INVENTIONS

In this application we present a carry extraction apparatus that accommodates and includes all functional categories. We also provide a means to predict overflow for three-to-one ALU operations. We present result equal zero prediction hardware for the categories; arithmetic followed by arithmetic and logical followed by arithmetic. We prove that the proposed apparatus's will not constitute a critical path when compared to high speed three-to-one ALU's. We provide parallel status determination for three high speed three-to-one ALU's subdivided into two implementation categories.

Our implementations of the preferred embodiment of each of our inventions are detailed in the following detailed description. For a better understanding of the inventions, together with advantages and features, reference may be had to the copending applications for some detailed additional background. Further, specifically as to the improvements described herein reference should be made to the following description and the below-described drawings.

BRIEF DESCRIPTION OF THE DRAWINGS

FIG. 2 represents parallel extraction of carries for parallel prediction of status (first embodiment)

DETAILED DESCRIPTION OF THE PREFERRED EMBODIMENTS

To prove the feasibility of the parallel status determination embodiments a fast ALU implementation must be assumed as a basis for making a comparison of the critical paths. We assume the fastest three-to-one ALU implementations known to us, i.e. as provided by the apparatus disclosed by U.S. Ser. No. 07/677,079, filed Mar. 29, 1991, now U.S. Pat. No. 5,299,319, filed concurrently herewith, and included herein by reference as noted above. To describe our invention, we illustrate our invention by disclosure of equations which provide the implementation of our preferred embodiment of our various inventions, as implementations of the embodiments, each of which may be commonly known as a scheme or schema.

Carry Extraction for the First Implementation Scheme

Figure 1:
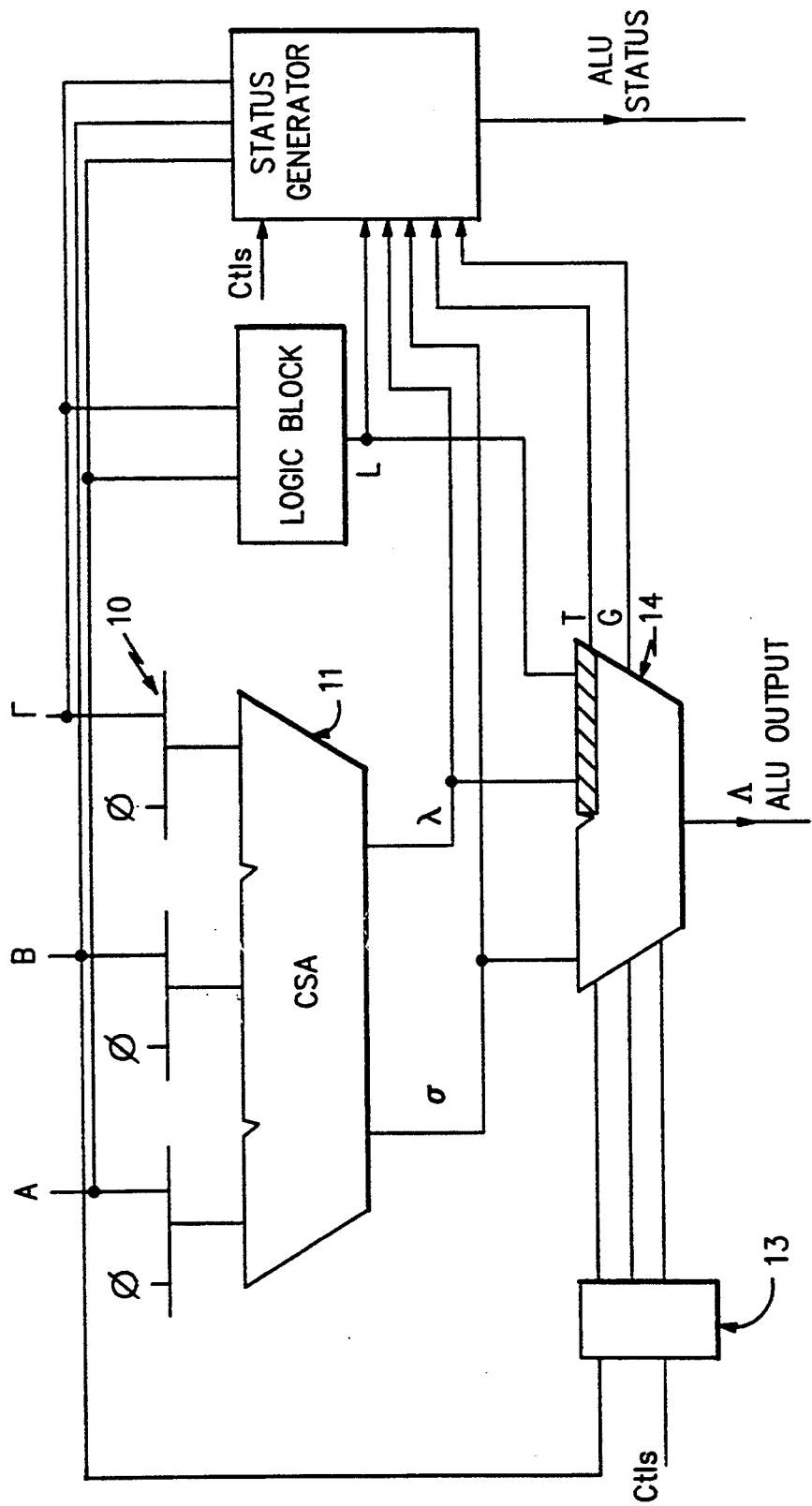
FIG. 1 represents a three-to-one ALU, and a parallel status predictor.

In this implementation scheme, the carry from the CSA at bit position i is:

$$\lambda_i = \alpha_i \beta_i + \alpha_i \gamma_i + \beta_i \gamma_i$$

where $\alpha_i$, $\beta_i$, and $\gamma_i$ represent the inputs into the CSA corresponding to the inputs of the ALU, $A_i$, $B_i$, and $\Gamma_i$, respectively. In this equation, + represents bitwise OR, and juxtaposition represents bitwise AND. The inputs A and $\Gamma$ contain the operands for the first instruction while the input B contains the independent operand for the second interlocked instruction. All inputs to the CSA can be forced to zero or fed the corresponding input as shown in FIG. 1.

First consider a three-to-one addition. For this case, the CSA carry is:

$$\lambda_i = A_i B_i + A_i \Gamma_i + B_i \Gamma_i,$$

the appropriate CSA carry for a three-to-two addition as desired by the above carry extraction algorithm. In addition the carry at bit position i due to the first instruction can be generated from the CSA inputs $\alpha_i$ and $\gamma_i$. Using CLA techniques, this carry at bit positions 0 and 1, $\kappa_0$ and $\kappa_1$, can be generated in three stages using the assumed bookset as follows:

STAGE 1

$$G_1^* = \alpha_1 \gamma_1$$

$$G_i^{*i+1} = \alpha_i \gamma_i + \alpha_{i+1} \gamma_{i+1}$$

$$i = 0, 2, 4, 6, \ldots 28$$

$$T_i = \alpha_i + \gamma_i$$

$$i = 0, 1, 4, 7, 8, 12, 16, 20, 28$$

$$T_i^{i+1} = \overline{\overline{\alpha_i \gamma_i} + \overline{\alpha_{i+1} \gamma_{i+1}}}$$

$$i = 1, 9, 17, 25$$

$$T_i^{i+2} = \overline{\overline{\alpha_i \gamma_i} + \overline{\alpha_{i+1} \gamma_{i+1}} + \overline{\alpha_{i+2} \gamma_{i+2}}}$$

$$i = 1, 4, 7, 9, 10, 12, 13, 16, 17, 19, 20, 22, 25, 28$$

$$\psi_{30} = \alpha_{30} \gamma_{30} + \alpha_{31} \gamma_{31} + \alpha_{31} \tau_2 + \gamma_{31} \tau_2$$

STAGE 2

$$G_1^{*7} = G_1^* + T_1^2 G_2^{*3} + T_1^3 T_4 G_4^{*5} + T_1^3 T_4^6 G_{*6}^7$$

$$G_i^{*i+7} = G_i^{*i+1} + T_{i+1}^{i+2} G_{i+2}^{*i+3} + T_{i+1}^{i+3} T_{i+4} G_{i+4}^{*i+5} + T_{i+1}^{i+3} T_{i+4}^{i+6} G_{i+6}^{*i+7}$$

$$i = 0, 8, 16$$

$$T_1^8 = T_1^3 T_4^6 T_7 T_8$$

$$T_1^{16} = T_1^3 T_4^6 T_7^9 T_{10}^{12} T_{13}^{15} T_{16}$$

$$T_1^{24} = T_1^3 T_4^6 T_7^9 T_{10}^{12} T_{13}^{15} T_{16}^{18} T_{19}^{21} T_{22}^{24}$$

$$\psi_{24}^{30} = G_{24}^{*25} + T_{25}^{26} G_{26}^{*27} + T_{25}^{27} T_{28} G_{28}^{*29} + T_{25}^{27} T_{28}^{30} \psi_{30}$$

STAGE 3

$$\kappa_0 = T_0 G_0^{*7} + T_0 T_1^8 G_8^{*15} + T_0 T_1^{16} G_{16}^{*23} + T_0 T_1^{24} \psi_{24}^{30}$$

$$\kappa_1 = T_1 G_1^{*7} + T_1^8 G_8^{*15} + T_1^{16} G_{16}^{*23} + T_1^{24} \psi_{24}^{30}.$$

In these expressions, $G_n^{*m}$, $T_n^m$, and $\Psi_n^m$ represent the pseudo-propagate, transmit and new carry, respectively, from bit position m to bit position n, while $G_n^*$ and $T_n$ represent the pseudo-generate and transmit, respectively, at bit position n. Definitions of these quantities can be found in Int. J. Elec. Vol. 67, No. 2, supra. Also, $\tau_2$ represents the hot one that would have been supplied during the execution of the first instruction. A set of requirements for $\tau_2$ that are sufficient, though maybe not necessary, to produce valid results for the three-to-one add/subtract operations has been given in U.S. Ser. No. 07/619,868 filed Nov. 28, 1990, supra. These requirements can be summarized as:

(1) if two hot ones are supplied to the three-to-one ALU, then $\tau_2 = 1$;
(2) if no hot ones are supplied to the three-to-one ALU, then $\tau_2 = 0$;
(3) if adding/subtracting a third operand with the result of a logical operation, then $\tau_2 = 0$.

The above logical expressions produce zero for both $\kappa_0$ and $\kappa_1$ when the second functional category is executed. This result follows since both $\alpha$ and $\gamma$ are forced to zero when executing this functional category. With $\alpha$ and $\gamma$ both zero, all of the pseudo-generates and transmits will be zero. In addition, since $\tau_2$ is zero, the new carry's, $\Psi_i$'s are all zero. Thus, all of the literals in the expressions for $\kappa_0$ and $\kappa_1$ are zero so that the results will be zero. With $\kappa_0$ and $\kappa_1$ both zero and since $\lambda_0$ and $\lambda_1$ are both zero as noted above, the algorithm for extracting the carries, $c_0$ and $c_1$ reduce to:

$$c_0 = 0 \lor 0 \lor \phi_0 = \phi_0$$

$$c_1 = 0 \lor 0 \lor \phi_1 = \phi_1.$$

Thus, the extracted carries equal the carries from the CLA as desired.

Extraction of carries due to the second instruction of a compound instruction pair is required only for the first two functional categories as was discussed in the Background of Related Inventions section specifically regarding U.S. Ser. No. 07/619,868, supra.

The stage-by-stage implementation for generating $\kappa_0$ and $\kappa_1$ was given above. To this implementation the expressions leading to $\lambda_0$, $\lambda_1$, $\phi_0$, $\phi_1$, and ultimately to $c_0$ and $c_1$ must be added to complete the implementation for generating $c_0$ and $c_1$. A stage-by-stage description for the first implementation scheme is given below. In this description, pseudo-generates and transmits for generating $\kappa_0$ and $\kappa_1$ have been subscripted with a cc (carry correct) to distinguish them from the pseudo-generates and transmits of the CLA used in the three-to-one add/subtract by which $\phi_0$ and $\phi_1$ are generated. The expressions at each stage are:

STAGE 1

$G^*_{cc1} = \alpha_1 \gamma_1$ $G^{*i+1}_{cci} = \alpha_i \gamma_i + \alpha_{i+1} \gamma_{i+1}$ $i = 0, 2, 4, 6, \ldots, 28$ $T_{cci} = \alpha_i + \gamma_i$ $i = 0, 1, 4, 7, 8, 12, 16, 20, 28$ $T^{i+1}_{cci} = \overline{\overline{\alpha_i \gamma_i} + \overline{\alpha_{i+1} \gamma_{i+1}}}$ $i = 1, 9, 17, 25$ $T^{i+2}_{cci} = \overline{\overline{\alpha_i \gamma_i} + \overline{\alpha_{i+1} \gamma_{i+1}} + \overline{\alpha_{i+2} \gamma_{i+2}}}$ $i = 1, 4, 7, 9, 10, 12, 13, 16, 17, 19, 20, 22, 25, 28$ $\psi_{30} = \alpha_{30}\gamma_{30} + \alpha_{31}\gamma_{31} + \alpha_{31}\tau_2 + \gamma_{31}\tau_2$ $\lambda_i = \alpha_i \beta_i + \alpha_i \gamma_i + \beta_i \gamma_i$ $0 \leq i \leq 31$ $\sigma_i = \alpha_i \forall \beta_i \forall \gamma_i$ $0 \leq i \leq 31$ $L_i = A_i \Omega_{OALASL} + \Gamma_i \Omega_{AOLASL} + A_i \Gamma_i \Omega_{XAAL} + \overline{A_i \Gamma_i} \Omega_{XOSL}$ $0 \leq i \leq 31$

STAGE 2

$G^{*7}_{cc1} = G^*_{cc1} + T^2_{cc1} G^{*3}_{cc2} + T^3_{cc1} T_{cc4} G^{*5}_{cc4} + T^3_{cc1} T^6_{cc4} G^{*7}_{cc8}$ $G^{*i+7}_{cci} = G^{*i+1}_{cci} + T^{i+2}_{cci+1} G^{*i+3}_{cci+2} + T^{i+3}_{cci+1} T_{cci+4} G^{*i+5}_{cci+4} +$
$\qquad T^{i+3}_{cci+1} T^{i+6}_{cci+4} G^{*i+7}_{cci+8}$ $i = 0, 8, 16$ $T^8_{cc1} = T^3_{cc1} T^6_{cc4} T_{cc7} T_{cc8}$ $T^{16}_{cc1} = T^3_{cc1} T^6_{cc4} T^9_{cc7} T^{12}_{cc10} T^{15}_{cc13} T_{cc16}$ $T^{24}_{cc1} = T^3_{cc1} T^6_{cc4} T^9_{cc7} T^{12}_{cc10} T^{15}_{cc13} T^{18}_{cc16} T^{21}_{cc19} T^{24}_{cc22}$ $\psi^{30}_{24} = G^{*25}_{cc24} + T^{26}_{cc25} G^{*27}_{cc26} + T^{27}_{cc25} T_{cc28} G^{*29}_{cc28} + T^{27}_{cc25} T^{30}_{cc28} \psi_{30}$ $G^{*i+1}_i = \lambda_{i+1} \sigma_i + \lambda_{i+2} \sigma_{i+1} + L_i \sigma_i + L_{i+1} \sigma_{i+1}$ $i = 1, 3, 5, \ldots, 29$ $T_i = \sigma_i + \lambda_{i+1} + L_i$ $i = 1, 5, 8, 9, 13, 17, 21, 29$ $T^{i+1}_i = \overline{\overline{\sigma_i \lambda_{i+1} L_i} + \overline{\sigma_{i+1} \lambda_{i+2} L_{i+1}}}$ $i = 2, 10, 18, 23, 26$ $T^{i+2}_i = \overline{\overline{\sigma_i \lambda_{i+1} L_i} + \overline{\sigma_{i+1} \lambda_{i+2} L_{i+1}} + \overline{\sigma_{i+2} \lambda_{i+3} L_{i+2}}}$ $i = 2, 5, 8, 10, 11, 13, 14, 17, 18, 20, 21, 23, 26, 29$ $\Phi_{31} = \tau_2 \sigma_{31} + L_{31} \sigma_{31} + \tau_1$

STAGE 3

$\kappa_0 = T_{cc0} G^{*7}_{cc0} + T_{cc0} T^8_{cc1} G^{*15}_{cc8} + T_{cc0} T^{18}_{cc1} G^{*23}_{cc16} + T_{cc0} T^{24}_{cc1} \psi^{30}_{24}$ $\kappa_1 = T_{cc1} G^{*7}_{cc1} + T^8_{cc1} G^{*15}_{cc8} + T^{16}_{cc1} G^{*23}_{cc16} + T^{24}_{cc1} \psi^{30}_{24}$ $G^{*i+7}_i + G^{*i+1}_i + T^{i+2}_{i+1} G^{*i+3}_{i+2} + T^{i+3}_{i+1} T_{i+4} G^{*i+5}_{i+4} +$
$T^{i+3}_{i+1} T^{i+6}_{i+4} G^{*i+7}_{i+8}$ $i = 1, 9, 17$ $T^9_2 = T^4_2 T^7_5 T_8 T_9$ $T^{17}_2 = T^4_2 T^7_5 T^{10}_8 T^{13}_{11} T^{16}_{14} T_{17}$ $T^{25}_2 = T^4_2 T^7_5 T^{10}_8 T^{13}_{11} T^{16}_{14} T^{19}_{17} T^{22}_{20} T^{25}_{23}$ $\Phi^{30}_{25} = G^{*26}_{25} + T^{27}_{26} G^{*28}_{27} + T^{28}_{26} T_{29} G^{*30}_{29} + T^{28}_{26} T^{31}_{29} \Phi_{31}$

STAGE 4

$\kappa_0^* = \kappa_0 \forall \lambda_0$ $\kappa_1^* = \kappa_1 \forall \lambda_1$ $\phi_1 = T_1 G_1^{*8} + T_1 T^9_2 G_9^{*16} + T_1 T^{17}_2 G_{17}^{*24} + T_1 T^{25}_2 \Phi^{31}_{25}$

STAGE 5

$c_1 = \kappa_1^* \forall \phi_1$ $c_0 = \kappa_0^* \overline{T_0} + \kappa_0^* \overline{G_0} \phi_1 + \overline{\kappa_0^* G_0} + \overline{\kappa_0^* T_0 \phi_1}$.

All of the above expressions, except that for the calculation of $c_0$ follow from a direct application of the algorithm for extracting carries due to the second instruction or from the recursive equations for hardwired binary adders as discussed in Int. J. Elec. Vol. 67, No. 2, supra. The expression for $c_0$ can be derived as follows. The expression for $c_0$ is:

$$c_0 = \kappa_0 \forall \lambda_0 \forall \phi_0$$
$$= \kappa_0^* \forall \phi_0.$$

But, $\phi_0$ can be expressed as:

$$\phi_0 = T_0 \Phi_0.$$

Substituting the expression for $\Phi_0$:

$$\Phi_0 = G_0^* + T_1 \Phi_1$$

into the expression for $\phi_0$ produces:

$$\phi_0 = T_0(G_0^* + T_1 \Phi_1)$$
$$= T_0 G_0^* + T_0 T_1 \Phi_1.$$

Recognizing that $T_1 \Phi_1$ is $\phi_1$ allows $\phi_0$ to be written as:

$$\phi_0 = T_0 G_0^* + T_0 \phi_1.$$

This expression for $\phi_0$ can now be substituted into the expression for generating $c_0$ to give:

$$c_0 = \kappa_0^* \, \forall \, (T_0 G_0^* + T_0 \phi_1).$$

Expanding the above expression into the canonical sum of products for EXCLUSIVE-OR produces:

$$\begin{aligned}
c_0 &= \kappa_0^*(\overline{T_0 G_0^*} + \overline{T_0 \phi_1}) + \overline{\kappa_0^*}(T_0 G_0^* + T_0 \phi_1)\\
&= \kappa_0^* \overline{T_0 G_0^*}\, \overline{T_0 \phi_1} + \overline{\kappa_0^*} T_0 G_0^* + \overline{\kappa_0^*} T_0 \phi_1\\
&= \kappa_0^*(\overline{T_0} + \overline{G_0^*})(\overline{T_0} + \overline{\phi_1}) + \overline{\kappa_0^*} T_0 G_0^* + \overline{\kappa_0^*} T_0 \phi_1\\
&= \kappa_0^*(\overline{T_0} + \overline{T_0 G_0^*} + \overline{T_0 \phi_1} + \overline{G_0^* \phi_1}) + \overline{\kappa_0^*} T_0 G_0^* + \overline{\kappa_0^*} T_0 \phi_1\\
&= \kappa_0^*(\overline{T_0} + \overline{G_0^* \phi_1}) + \overline{\kappa_0^*} T_0 G_0^* + \overline{\kappa_0^*} T_0 \phi_1\\
&= \kappa_0^* \overline{T_0} + \kappa_0^* \overline{G_0^* \phi_1} + \overline{\kappa_0^*} T_0 G_0^* + \overline{\kappa_0^*} T_0 \phi_1.
\end{aligned}$$

But $T_0 G_0^*$ can be reduced to:

$$\begin{aligned}
T_0 G_0^* &= (\sigma_0 + \lambda_1 + L_0)\sigma_0(\lambda_1 + L_0)\\
&= \sigma_0(\lambda_1 + L_0) + \sigma_0(\lambda_1 + L_0)\\
&= \sigma_0(\lambda_1 + L_0)\\
&= G_0^*.
\end{aligned}$$

Substituting this into the expression for $c_0$ yields:

$$c_0 = \kappa_0^* \overline{T_0} + \kappa_0^* \overline{G_0^* \phi_1} + \overline{\kappa_0^*} G_0^* + \overline{\kappa_0^*} T_0 \phi_1$$

which is the expression used in the five stage implementation. Thus, both $c_0$ and $c_1$ can be generated in five stages with the assumed bookset for this implementation scheme. The logic diagram for the generation of $c_0$ and $c_1$ for the first implementation scheme are depicted in FIG. 2.

Carry Extraction for the Second Implementation Scheme

Complications arise when attempting to apply the carry extraction algorithm to the second scheme for implementing the SCISM ALU. These complications arise because $\lambda_i$ and $\kappa_i$ are not guaranteed to be a logic zero when a three-to-one addition is not desired. For example, the CSA carry for this implementation is computed by U.S. Ser. No. 07/504,910, supra.:

$$\lambda_0 = \Omega_1 \alpha_0 \beta_0 + \Omega_2 \alpha_0 \gamma_0 + \Omega_1 \beta_0 \gamma_0$$

$$\lambda_i = \Omega_1 \alpha_i \beta_i + \Omega_2 \alpha_i \gamma_i + \Omega_1 \beta_i \gamma_i + \Omega_3 \beta_{i-1}$$

$$1 \leq i \leq 31$$

$$\lambda_{32} = \Omega_3 \beta_{31} + \overline{\Omega_3} \tau_2.$$

$$1 \leq i \leq 31$$

For this implementation to execute the second functional category, it is required that $\lambda_i$ be equal to $B_{i-1}$ when $1 \leq i \leq 32$. This can be achieved by making $\Omega_1$, $\Omega_2$, and $\tau_2$ a logic zero while making $\Omega_3$ a logic one. Therefore, $\lambda_i$ takes on the value of the ALU input, $B_{i-1}$. Consequently, $\lambda_i$ can not be guaranteed to be a logic zero for $1 \leq i \leq 32$. Similarly, $\kappa_i$ can not be guaranteed to be a logic zero since the operands corresponding to the first instruction are not forced to a logic zero. Because of these results, controls must be added to the implementation of the carry extraction algorithm to extract the desired carry as if $\lambda_i$ and $\kappa_i$ were logic zero, but allow $\lambda_i$ and $\kappa_1$ to be used as generated when extracting the carries due to a three-to-one add/subtract.

The complication due to $\lambda_i$ not being a logic zero when it is not utilized can be overcome by producing a conventional CSA carry that is gated by a control signal indicating that the operation being executed is a three-to-one add/subtract. This signal must only control the carries generated at the bit positions zero and one as these are the only positions at which the carries due to the second operation need to be extracted for generating ALU status. These additional carry signals, denoted as $\lambda_{cc0}$ and $\lambda_{cc1}$, are generated as:

$$\lambda_{cc0} = \Omega_{3 \, to \, 1} \alpha_0 \beta_0 + \Omega_{3 \, to \, 1} \alpha_0 \gamma_0 + \Omega_{3 \, to \, 1} \beta_0 \gamma_0$$

$$\lambda_{cc1} = \Omega_{3 \, to \, 1} \alpha_1 \beta_1 + \Omega_{3 \, to \, 1} \alpha_1 \gamma_1 + \Omega_{3 \, to \, 1} \beta_1 \gamma_1$$

where $\Omega_{3 \, to \, 1}$ is the control signal and is a logic one if a three-to-one addition/subtraction is being executed. These extra carry signals have the desired property of being the CSA carry when a three-to-one add/subtract is being executed but being a logic zero otherwise; therefore, they can be substituted into the carry extraction algorithm for $\lambda_0$ and $\lambda_1$ when extracting $c_0$ and $c_1$. The complication of $\kappa_1$ not being a logic zero when not being utilized can be overcome by considering the third stage in the generation of $\kappa_0$ and $\kappa_1$. In this stage, these quantities are produced by the expressions:

$$\kappa_0 = T_0 G_0^{*7} + T_0 T_1^8 G_8^{*15} + T_0 T_1^{16} G_{16}^{*23} + T_0 T_1^{24} \Psi_{24}^{30}$$

$$\kappa_1 = T_1 G_1^{*7} + T_1^8 G_8^{*15} + T_1^{16} G_{16}^{*23} + T_1^{24} \Psi_{24}^{30}.$$

Since the expression for $\kappa_1$ is directly implemented in the assumed bookset by a 2×4 AO book, the gating control signal indicating that a three-to-one add/subtract operation is being executed can be directly applied resulting in a 3×4 AO book. Thus, $\kappa_1$, can be produced by:

$$\kappa_1 = \Omega_{3 \, to \, 1} T_1 G_1^{*7} + \Omega_{3 \, to \, 1} T_1^8 G_8^{*15} + \Omega_{3 \, t1} T_1^{16} G_{16}^{*23} + \Omega_{3 \, to \, 1} T_1^{24} \Psi_{24}^{30}.$$

This signal has the desired qualities of being zero when a three-to-one add/subtract operation is not specified but being the carry produced into the MSB during the execution of the first instruction when a three-to-one add/subtract operation is specified. A first glance at the expression for generating $\kappa_0$ is discouraging for using a similar approach since the expression for generating $\kappa_0$ already requires a 3×4 AO book. However, the expression for the literal, $T_0$, which can be generated in the first stage, is:

$$T_0 = \alpha_0 + \gamma_0.$$

This expression requires a two-way OR book to which a gating signal can be added resulting in a 2×2

AO book. The gated $T_0$, denoted as $T_0^*$, therefore, can be generated in the first stage and substituted for $T_0$ in the third stage expression for generating $\kappa_0$. The results are:

STAGE 1

$$G_1^* = \alpha_1 \gamma_1$$

$$G_i^{*i+1} = \alpha_i \gamma_i + \alpha_{i+1} \gamma_{i+1}$$

$$i = 0, 2, 4, 6, \ldots 28$$

$$T_i = \alpha_i + \gamma_i$$

$$i = 1, 4, 7, 8, 12, 16, 20, 28$$

$$T_0^* = \Omega_{3to1}\alpha_0 + \Omega_{3to1}\gamma_0$$

$$T_i^{i+1} = \overline{\overline{\alpha_i \gamma_i} + \overline{\alpha_{i+1}\gamma_{i+1}}}$$

$$i = 1, 9, 17, 25$$

$$T_i^{i+2} = \overline{\overline{\alpha_i \gamma_i} + \overline{\alpha_{i+1}\gamma_{i+1}} + \overline{\alpha_{i+2}\gamma_{i+2}}}$$

$$i = 1, 4, 7, 9, 10, 12, 13, 16, 17, 19, 20, 22, 25, 28$$

$$\psi_{30} = \alpha_{30}\gamma_{30} + \alpha_{31}\gamma_{31} + \alpha_{31}\tau_2 + \gamma_{31}\tau_2$$

STAGE 2

$$G_1^{*7} = G_1^* + T_1^2 G_2^{*3} + T_1^3 T_4 G_4^{*5} + T_1^3 T_4^6 G_{*6}^7$$

$$G_i^{*i+7} = G_i^{*i+1} + T_{i+1}^{i+2} G_{i+2}^{*i+3} + T_{i+1}^{i+3} T_{i+4} G_{i+4}^{*i+5} + T_{i+1}^{i+3} T_{i+4}^{i+6} G_{i+6}^{*i+7}$$

$$i = 0, 8, 16$$

$$T_1^8 = T_1^3 T_4^6 T_7 T_8$$

$$T_1^{16} = T_1^3 T_4^6 T_7^9 T_{10}^{12} T_{13}^{15} T_{16}$$

$$T_1^{24} = T_1^3 T_4^6 T_7^9 T_{10}^{12} T_{13}^{15} T_{16}^{18} T_{19}^{21} T_{22}^{24}$$

$$\psi_{24}^{30} = G_{24}^{*25} + T_{25}^{26} G_{26}^{*27} + T_{25}^{27} T_{28} G_{28}^{*29} + T_{25}^{27} T_{28}^{30} \psi_{30}$$

STAGE 3

$$\kappa_0 = T_0^* G_0^{*7} + T_0^* T_1^8 G_8^{*15} + T_0^* T_1^{16} G_{16}^{*23} + T_0^* T_1^{24} \psi_{24}^{30}$$

$$\kappa_1 = \Omega_{3\,to\,1} T_1 G_1^{*7} + \Omega_{3\,to\,1} T_1^8 G_8^{*15} + \Omega_{3\,to\,1} T_1^{16} G_{16}^{*23} + \Omega_{3\,to\,1} T_1^{24} \psi_{24}^{30}.$$

Both $\kappa_0$ and $\kappa_1$ generated in this manner have the desired property of being the carry due to the execution of the first instruction when executing a three-to-one add/subtract but being a logic zero otherwise.

From the above results, $c_0$ and $c_1$ can be determined by:

$$c_0 = \kappa_0 \,\forall\, \lambda_{cc0} \,\forall\, \phi_0$$

$$c_1 = \kappa_1 \,\forall\, \lambda_{cc1} \,\forall\, \phi_1$$

where $\kappa_0$ and $\kappa_1$ are generated as just described. No additional restrictions have been placed on supplying hot ones to the ALU for this technique.

Both $c_0$ and $c_1$ can be generated in five stages for this implementation scheme; therefore, no additional delay results from the implementation. A stage-by-stage description of the carry extraction follows. As for the description for the first implementation scheme, the pseudo-generates and transmits associated with generating $\kappa_0$ and $\kappa_1$ have been subscripted with cc to distinguish them from their counterparts for executing the three-to-one add. The stage-by-stage implementation is:

STAGE 1

$$G_{cc1}^* = \alpha_1 \gamma_1$$

$$G_{cci}^{*i+1} = \alpha_i \gamma_i + \alpha_{i+1} \gamma_{i+1}$$

$$i = 0, 2, 4, 6, \ldots 28$$

$$T_{cci} = \alpha_i + \gamma_i$$

$$i = 1, 4, 7, 8, 12, 16, 20, 28$$

$$T_{cc0}^* = \Omega_{3to1}\alpha_0 + \Omega_{3to1}\gamma_0$$

$$T_{cci}^{i+1} = \overline{\overline{\alpha_i \gamma_i} + \overline{\alpha_{i+1}\gamma_{i+1}}}$$

$$i = 1, 9, 17, 25$$

$$T_{cci}^{i+2} = \overline{\overline{\alpha_i \gamma_i} + \overline{\alpha_{i+1}\gamma_{i+1}} + \overline{\alpha_{i+2}\gamma_{i+2}}}$$

$$i = 1, 4, 7, 9, 10, 12, 13, 16, 17, 19, 20, 22, 25, 28$$

$$\psi_{30} = \alpha_{30}\gamma_{30} + \alpha_{31}\gamma_{31} + \alpha_{31}\tau_2 + \gamma_{31}\tau_2$$

$$\lambda_0 = \Omega_1 \alpha_0 \beta_0 + \Omega_2 \alpha_0 \gamma_0 + \Omega_1 \beta_0 \gamma_0$$

$$\lambda_i = \Omega_1 \alpha_i \beta_i + \Omega_2 \alpha_i \gamma_i + \Omega_1 \beta_i \gamma_i + \Omega_3 \beta_{i-1}$$

$$1 \leq i \leq 31$$

$$\lambda_{32} = \Omega_3 \beta_{31} + \overline{\Omega_3 \tau_2}.$$

$$\lambda_{cc0} = \Omega_{3to1}\alpha_0\beta_0 + \Omega_{3to1}\alpha_0\gamma_0 + \Omega_{3to1}\beta_0\gamma_0$$

$$\lambda_{cc1} = \Omega_{3to1}\alpha_1\beta_1 + \Omega_{3to1}\alpha_1\gamma_1 + \Omega_{3to1}\beta_1\gamma_1.$$

$$\sigma_i = \alpha_i \,\forall\, \beta_i \,\forall\, \gamma_i$$

$$0 \leq i \leq 31$$

$$L_i = A_i \Omega_{OALASL} + \Gamma_i \Omega_{AOLASL} + \overline{A_i} \Gamma_i \Omega_{XAAL} + A_i \overline{\Gamma_i} \Omega_{XOSL}$$

$$0 \leq i \leq 31$$

STAGE 2

$$G_{cc1}^{*7} = G_{cc1}^* + T_{cc1}^2 G_{cc2}^{*3} + T_{cc1}^3 T_{cc4} G_{cc4}^{*5} + T_{cc1}^3 T_{cc4}^6 G_{cc8}^{*7}$$

$$G_{cci}^{*i+7} = G_{cci}^{*i+1} + T_{cci+1}^{i+2} G_{cci+2}^{*i+3} + T_{cci+1}^{i+3} T_{cci+4} G_{cci+4}^{*i+5} + T_{cci+1}^{i+3} T_{cci+4}^{i+6} G_{cci+8}^{*i+7}$$

$$i = 0, 8, 16$$

$$T_{cc1}^8 = T_{cc1}^3 T_{cc4}^6 T_{cc7} T_{cc8}$$

$$T_{cc1}^{16} = T_{cc1}^3 T_{cc4}^6 T_{cc7}^9 T_{cc10}^{12} T_{cc13}^{15} T_{cc16}$$

$$T_{cc1}^{24} = T_{cc1}^3 T_{cc4}^6 T_{cc7}^9 T_{cc10}^{12} T_{cc13}^{15} T_{cc16}^{18} T_{cc19}^{21} T_{cc22}^{24}$$

$$\psi_{24}^{30} = G_{cc24}^{*25} + T_{cc25}^{26} G_{cc26}^{*27} + T_{cc25}^{27} T_{cc28} G_{cc28}^{*29} + T_{cc25}^{27} T_{cc28}^{30} \psi_{30}$$

$$G_i^{*i+1} = \Omega_4 \sigma_i \lambda_{i+1} + \Omega_4 \sigma_{i+1} \lambda_{i+2} + L_i \lambda_{i+1} + L_{i+1} \lambda_{i+2}$$

$$i = 1, 3, 5, \ldots, 29$$

$$T_i = \lambda_{i+1} + \Omega_4 \sigma_i + L_i$$

$$i = 1, 5, 8, 9, 13, 17, 21, 29$$

$$T_i^{i+1} = \overline{\overline{\lambda_{i+1} \Omega_4 L_i} + \overline{\lambda_{i+1} \sigma_i L_i} + \overline{\lambda_{i+2} \Omega_4 L_{i+1}} + \overline{\lambda_{i+2} \sigma_{i+1} L_{i+1}}}$$

$$i = 2, 10, 18, 23, 26$$

$$T_i^{i+2} = (\lambda_{i+1} + \Omega_4 \sigma_i + L_i)(\lambda_{i+2} +$$

$$\Omega_4 \sigma_{i+1} + L_{i+1})(\lambda_{i+3} + \Omega_4 \sigma_{i+2} + L_{i+2})$$

-continued $i = 2, 5, 8, 10, 11, 13, 14, 17, 18, 20, 21, 23, 26, 29$ $\Phi_{31} = \psi_4 \sigma_{31} \lambda_{32} + L_{31} \lambda_{32} + \tau_1$

STAGE 3

$\kappa_0 = T^*_{cc0} G^{*7}_{cc0} + T^*_{cc0} T^8_{cc1} G^{*15}_{cc8} + T^*_{cc0} T^{16}_{cc1} G^{*23}_{cc16} + T^*_{cc0} T^{24}_{cc1} \psi^{30}_{24}$ $\kappa_1 = \Omega_{3to1} T_{cc1} G^{*7}_{cc1} + \Omega_{3to1} T^8_{cc1} G^{*15}_{cc8} +$ $\Omega_{3to1} T^{16}_{cc1} G^{*23}_{cc16} + \Omega_{3to1} T^{24}_{cc1} \psi^{30}_{24}$ $G^{*i+7}_i = G^{*i+1}_i + T^{i+2}_{i+1} G^{*i+3}_{i+2} + T^{i+3}_{i+1} T_{i+4} G^{*i+5}_{i+4} + T^{i+3}_{i+1} T^{i+6}_{i+4} G^{*i+7}_{i+6}$ $i = 1, 9, 17$ $T_2^9 = T_2^4 T_5^7 T_8 T_9$ $T_2^{17} = T_2^4 T_5^7 T_8^{10} T_{11}^{13} T_{14}^{16} T_{17}$ $T_2^{25} = T_2^4 T_5^7 T_8^{10} T_{11}^{13} T_{14}^{16} T_{17}^{19} T_{20}^{22} T_{23}^{25}$ $\Phi^{30}_{25} = G^{*26}_{25} + T^{27}_{26} G^{*28}_{27} + T^{28}_{26} T_{29} G^{*30}_{29} + T^{28}_{26} T^{31}_{29} \Phi_{31}$ STAGE 4
$\kappa_0^* = \kappa_0 \forall \lambda_{cc0}$ $\kappa_1^* = \kappa_1 \forall \lambda_{cc1}$ $\phi_1 = T_1 G^{*8}_1 + T_1 T_2^9 G^{*16}_9 + T_1 T_2^{17} G^{*24}_{17} + T_1 T_2^{25} \Phi^{31}_{25}$ STAGE 5
$c_1 = \kappa_1^* \forall \phi_1$ $c_0 = \kappa_0^* \overline{T_0} + \kappa_0^* \overline{G_0^*} \phi_1 + \overline{\kappa_0^* G_0^*} + \overline{\kappa_0^* T_0 \phi_1}.$ All of the expressions in the above implementation for extracting the carries from the second instruction can be implemented with the assumed bookset except for the transmit generated across three bit positions, $T_i^{i+2}$, which occurs in Stage 2. This transmit is needed to produce $\phi_1$ in the fourth stage which is then used to determine $c_0$ and $c_1$ in the fifth stage. If the generation of this transmit is to be avoided, $c_0$ and $c_1$ must be generated without the explicit generation of $\phi_1$.

To generate $c_0$ and $c_1$ without explicitly generating $\phi_1$, $\phi_1$ must be expanded using the recursive equations. Such an expansion gives:

$\phi_1 = T_1 G_1^{*x} + T_1 T_2^{x+1} \Phi^y_{x+1} \quad 1 \leq x < y \leq 31.$ Substituting this expression for $\phi_1$ into the expressions for $c_0$ and $c_1$ in Stage 5 gives:

$c_0 = \kappa_0^* \overline{T_0} + \kappa_0^* \overline{G_0^*} (T_1 G_1^{*x} + T_1 T_2^{x+1} \Phi^y_{x+1})$
$\overline{\kappa_0^* G_0^*} + \overline{\kappa_0^* T_0 (T_1 G_1^{*x}}$
$+ T_1 T_2^{x+1} \Phi^y_{x+1})$ $c_1 = \kappa_1^* \forall (T_1 G_1^{*x} + T_1 T_2^{x+1} \Phi^y_{x+1}).$ The expression for $c_1$ can be developed using standard Boolean techniques as follows.

$c_1 = \overline{\kappa_1^*}(T_1 G_1^{*x} + T_1 T_2^{x+1} \Phi^y_{x+1}) + \kappa_1^* (\overline{T_1 G_1^{*x}} + \overline{T_1 T_2^{x+1} \Phi^y_{x+1}})$ $= \overline{\kappa_1^*} T_1 G_1^{*x} + \overline{\kappa_1^*} T_1 T_2^{x+1} \Phi^y_{x+1} + \kappa_1^* \overline{T_1 G_1^{*x}} T_1 T_2^{x+1} \Phi^y_{x+1}$ $= \overline{\kappa_1^*} T_1 G_1^{*x} + \overline{\kappa_1^*} T_1^{x+1} \Phi^y_{x+1} + \kappa_1^* (\overline{T_1} + \overline{G_1^{*x}}) (\overline{T_1} + \overline{T_2^{x+1}} + \overline{\Phi^y_{x+1}})$ $= \overline{\kappa_1^*} T_1 G_1^{*x} + \overline{\kappa_1^*} T_1^{x+1} \Phi^y_{x+1} + \kappa_1^* (\overline{T_1} + \overline{G_1^{*x} T_2^{x+1}} + G_1^{*x} \Phi^y_{x+1})$ $= \kappa_1^* (\overline{T_1} + \overline{T_2^{x+1} G_1^{*x}}) + \overline{\kappa_1^*} T_1 G_1^{*x} + \overline{\kappa_1^*} T_1^{x+1} \Phi^y_{x+1} + \overline{\kappa_1^* G_1^{*x} \Phi^y_{x+1}}.$ This expression for $c_1$ can be generated in the fifth stage using the assumed bookset if:

$\overline{T_1 + T_2^{x+1} G_1^{*x}}$ $\overline{G_1^{*x}}$ $G_1^{*x}$ $\Phi^y_{x+1}$ $\overline{\Phi^y_{x+1}}$ can be generated in the fourth stage.

Now consider the expression for $c_0$. This expression can be developed using standard Boolean techniques as follows.

$c_0 = \kappa_0^* \overline{T_0} + \kappa_0^* \overline{G_0^*} T_1 G_1^{*x} T_1 T_2^{x+1} \Phi^y_{x+1} + \overline{\kappa_0^* G_0^*} +$
$\overline{\kappa_0^* T_0 T_1 G_1^{*x}} + \overline{\kappa_0^* T_0 T_1^{x+1} \Phi^y_{x+1}}$ $= \kappa_0^* \overline{T_0} + \kappa_0^* \overline{G_0^*} (\overline{T_1} + \overline{G_1^{*x}}) (\overline{T_1} + \overline{T_2^{x+1}} + \overline{\Phi^y_{x+1}}) +$
$\overline{\kappa_0^* G_0^*} + \overline{\kappa_0^* T_0^1 G_1^{*x}} + \overline{\kappa_0^* T_0^{x+1} \Phi^y_{x+1}}$ $= \kappa_0^* \overline{T_0} + \kappa_0^* \overline{G_0^*} (\overline{T_1} + \overline{T_2^{x+1} G_1^{*x}} + G_1^{*x} \Phi^y_{x+1}) +$
$\overline{\kappa_0^* G_0^*} + \overline{\kappa_0^* T_0^1 G_1^{*x}} + \overline{\kappa_0^* T_0^{x+1} \Phi^y_{x+1}}$ $= \kappa_0^* (\overline{T_0} + \overline{G_0^* T_1} + \overline{T_2^{x+1} G_0^* G_1^{*x}}) +$
$\overline{\kappa_0^* (G_0^* + T_0^1 G_1^{*x})} + \overline{\kappa_0^* G_0^* G_1^{*x} \Phi^y_{x+1}} + \overline{\kappa_0^* T_0^{x+1} \Phi^y_{x+1}}.$ This last expression can be used to generate $c_0$ in the fifth stage using the assumed bookset if, in addition to those values required for generating $c_1$, the following values are generated in the fourth stage:

$\overline{T_0 + G_0^* T_1 + T_2^{x+1} G_0^* G_1^{*x}}$ $G_0^* T_0^1 G_1^{*x}$ $\overline{G_0^* G_1^{*x}}$ $T_0^{x+1}.$ To determine whether the above signals can be generated by the fourth stage of the implementation, the values for $x$ and $y$ in the expressions, $\Phi^y_{x+1}$ and $G_1^{*x}$, must be determined. These values are determined by the number of bit positions that can be spanned in three stages for the new carry, $\Phi_n^m$, using the assumed bookset. By application of the recursive equations for binary adders, the number of bit positions that can be spanned for the assumed bookset is:

STAGE 1

Generate results for CSA and Logic function block as shown above

STAGE 2

$$G_i^{*i+1} = \Omega_4\sigma_i\lambda_{i+1} + \Omega_4\sigma_{i+1}\lambda_{i+2} + L_i\lambda_{i+1} + L_{i+1}\lambda_{i+2}$$

$i = 9, 11, 13, \ldots, 29$ $$T_i^{i+1} = \overline{\overline{\lambda_{i+1}\Omega_4 L_i} + \overline{\lambda_{i+1}\sigma_i L_i} + \overline{\lambda_{i+2}\Omega_4 L_{i+1}} + \overline{\lambda_{i+2}\sigma_{i+1}L_{i+1}}}$$

$i = 10, 12, 14, \ldots, 30$ $\Phi_{31} = \Omega_4\sigma_{31}\lambda_{32} + L_{31}\lambda_{32} + \tau_1$

STAGE 3

$$G_i^{*i+5} = G_i^{*i+1} + T_{i+1}^{i+2}G_{i+2}^{*i+3} + T_{i+1}^{i+2}T_{i+3}^{i+4}G_{i+4}^{*i+5}$$

$i = 9, 15, 21$ $T_{12}^{15} = T_{12}^{13}T_{14}^{15}$ $T_{12}^{21} = T_{12}^{13}T_{14}^{15}T_{16}^{17}T_{18}^{19}T_{20}^{21}$ $T_{12}^{27} = T_{12}^{13}T_{14}^{15}T_{16}^{17}T_{18}^{19}T_{20}^{21}T_{22}^{23}T_{24}^{25}T_{26}^{27}$ $\Phi_{27}^{30} = G_{27}^{*28} + T_{28}^{29}G_{29}^{*30} + T_{28}^{29}T_{30}^{31}\Phi_{31}$

STAGE 4

$$\Phi_9^{26} = G_9^{*14} + T_{10}^{11}T_{12}^{15}G_{15}^{*20} + T_{10}^{11}T_{12}^{21}G_{21}^{*26} + T_{10}^{11}T_{12}^{27}\Phi_{27}^{31}$$

from which x can be determined to be eight, and y to be 26. Substituting these values into the expressions that must be generated by the fourth stage provides the requirements for generating $c_0$ and $c_1$ in five stages with the assumed bookset. These requirements are the generation of:

$\overline{T_1 + T_2^9 G_1^{*8}}$ $G_1^{*8}$ $T_1^9$ $\overline{G_1^{*8}}$ $\overline{T_0 + G_0^* T_1 + T_2^9 G_0^* G_1^{*8}}$ $G_0^* + T_0^1 G_1^{*8}$ $\overline{G_0^*}$ $T_0^9$ by the fourth stage in addition to that of $\Phi_9^{26}$. $\Phi_9^{26}$ can be generated in the fourth stage as shown above; the remaining expressions can also be generated by the fourth stage by:

STAGE 1

Generate results for CSA and Logic function block as shown above

STAGE 2

$$G_i^{*i+1} = \Omega_4\sigma_i\lambda_{i+1} + \Omega_4\sigma_{i+1}\lambda_{i+2} + L_i\lambda_{i+1} + L_{i+1}\lambda_{i+2}$$

$i = 1, 3, 5, 7$ $G_0^* = \Omega_4\sigma_0\lambda_1 + L_0\lambda_1$ $T_i = \lambda_{i+1} + \Omega_4\sigma_i + L_i$ $i = 0, 1$ $$T_i^{i+1} = \overline{\overline{\lambda_{i+1}\Omega_4 L_i} + \overline{\lambda_{i+1}\sigma_i L_i} + \overline{\lambda_{i+2}\Omega_4 L_{i+1}} + \overline{\lambda_{i+2}\sigma_{i+1}L_{i+1}}}$$

$i = 0, 2, 4, 6, 8$

STAGE 3

$$G_i^{*i+5} = G_i^{*i+1} + T_{i+1}^{i+2}G_{i+2}^{*i+3} + T_{i+1}^{i+2}T_{i+3}^{i+4}G_{i+4}^{*i+5}$$

$i = 3$ $T_1^9 = T_1T_2^3T_4^5T_6^7T_8^9$ $T_2^9 = T_2^3T_4^5T_6^7T_8^9$ $U_1 = \overline{G_0^* G_1^{*2}}$

STAGE 4

$G_1^{*8} = G_1^{*2} + T_2^3 G_3^{*8}$ $\overline{G_1^{*8}} = \overline{G_1^{*2} + T_2^3 G_3^{*8}} = \overline{G_1^{*2}T_2^3} + \overline{G_1^{*2}G_3^{*8}}$ $u_2 = \overline{T_1 + T_2^9 G_1^{*8}} = \overline{T_1 + T_2^9 G_1^{*2}T_2^3}$
$\quad + \overline{T_2^9 G_1^{*2}G_3^{*8}} = \overline{T_1 + T_2^3 G_1^{*2} + T_2^9 G_1^{*2}G_3^{*8}}$ $U_3 = G_0^* + T_0^1 G_1^{*8} = G_0^* + T_0^1(G_1^{*2} + T_2^3 G_3^{*8})$
$\quad = G_0^* + T_0^1 G_1^{*2} + T_0^1 T_2^3 G_3^{*8}$ $u_4 = \overline{T_0 + G_0^* T_1 + T_2^9 G_0^* G_1^{*8}} = \overline{T_0 + G_0^* T_1}$
$\quad + \overline{T_2^9 G_0^*(G_1^{*2}T_2^3 + G_1^{*2}G_3^{*8})} = \overline{T_0 + G_0^* T_1}$
$\quad + \overline{T_2^3 u_1 + T_2^9 u_1 G_3^{*8}}$ From the above considerations, the stage by stage implementation for generating $c_0$ and $c_1$ in five stages is:

STAGE 1

$G_{cc1}^* = \alpha_1\gamma_1$ $G_{cci}^{*i+1} = \alpha_i\gamma_i + \alpha_{i+1}\gamma_{i+1}$ $i = 0, 2, 4, 6, \ldots 28$ $T_{cci} = \alpha_i + \gamma_i$ $i = 1, 4, 7, 8, 12, 16, 20, 28$ $T_{cc0}^* = \Omega_{3to1}\alpha_0 + \Omega_{3to1}\gamma_0$ $T_{cci}^{i+1} = \overline{\overline{\alpha_i\gamma_i} + \overline{\alpha_{i+1}\gamma_{i+1}}}$ $i = 1, 7, 9, 17, 25$ $T_{cci}^{i+2} = \overline{\overline{\alpha_i\gamma_i} + \overline{\alpha_{i+1}\gamma_{i+1}} + \overline{\alpha_{i+2}\gamma_{i+2}}}$ $i = 1, 4, 7, 9, 10, 12, 13, 16, 17, 19, 20, 22, 25, 28$ -continued $\psi_{30} = \alpha_3 0 \gamma_{30} + \alpha_{31} \gamma_{31} + \alpha_{31} \tau_2 + \gamma_{31} \tau_2$ $\lambda_0 = \Omega_1 \alpha_0 \beta_0 + \Omega_2 \alpha_0 \gamma_0 + \Omega_1 \beta_0 \gamma_0$ $\lambda_i = \Omega_1 \alpha_i \beta_i + \Omega_2 \alpha_i \gamma_i + \Omega_1 \beta_i \gamma_i + \Omega_3 \beta_{i-1}$ $1 \leq i \leq 31$ $\lambda_{32} = \Omega_3 \beta_{31} + \overline{\Omega_3 \tau_2}.$ $\lambda_{cc0} = \Omega_{3to1} \alpha_0 \beta_0 + \Omega_{3to1} \alpha_0 \gamma_0 + \Omega_{3to1} \beta_0 \gamma_0$ $\lambda_{cc1} = \Omega_{3to1} \alpha_1 \beta_1 + \Omega_{3to1} \alpha_1 \gamma_1 + \Omega_{3to1} \beta_1 \gamma_1.$ $\sigma_i = \alpha_i \forall \beta_i \forall \gamma_i$ $0 \leq i \leq 31$ $L_i = A_i \Omega_{OALASL} + \Gamma_i \Omega_{AOLASL} + \overline{A_i} \Gamma_i \Omega_{XAAL} + \overline{A_i} \Gamma_i \Omega_{XOSL}$ $0 \leq i \leq 31$

STAGE 2

$G_{cc1}^{*7} = G_{cc1}^{*} + T_{cc1}^2 G_{cc2}^{*3} + T_{cc1}^3 T_{cc4} G_{cc4}^{*5} + T_{cc1}^3 T_{cc4}^6 G_{cc8}^{*7}$ $G_{cci}^{*i+7} = G_{cci}^{*i+1} + T_{cci+1}^{i+2} G_{cci+2}^{*i+3} + T_{cci+1}^{i+3} T_{cci+4} G_{cci+4}^{*i+5} + T_{cci+1}^{i+3} T_{cci+4}^{i+6} G_{cci+8}^{*i+7}$ $i = 0, 8, 16$ $T_{cc1}^8 = T_{cc1}^3 T_{cc4}^6 T_{cc7} T_{cc8}$ $T_{cc1}^{16} = T_{cc1}^3 T_{cc4}^6 T_{cc7}^9 T_{cc10}^{12} T_{cc13}^{15} T_{cc16}$ $T_{cc1}^{24} = T_{cc1}^3 T_{cc4}^6 T_{cc7}^9 T_{cc10}^{12} T_{cc13}^{15} T_{cc16}^{18} T_{cc19}^{21} T_{cc22}^{24}$ $\psi_{24}^{30} = G_{cc24}^{*25} + T_{cc25}^{26} G_{cc26}^{*27} + T_{cc25}^{27} T_{cc28} G_{cc28}^{*29} + T_{cc25}^{27} T_{cc28}^{30} \psi_{30}$ $G_i^{*i+1} = \Omega_4 \sigma_i \lambda_{i+1} + \Omega_4 \sigma_{i+1} \lambda_{i+2} + L_i \lambda_{i+1} + L_{i+1} \lambda_{i+2}$ $i = 1, 3, 5, \ldots, 29$ $G_0^* = \Omega_4 \sigma_0 \lambda_1 + L_0 \lambda_1$ $T_i = \lambda_{i+1} + \Omega_4 \sigma_i + L_i$ $i = 0, 1$ $T_1^{i+1} = \overline{\lambda_{i+1} \Omega_4 L_i} + \overline{\lambda_{i+1} \sigma_i L_i} + \overline{\lambda_{i+2} \Omega_4 L_{i+1}} + \overline{\lambda_{i+2} \sigma_{i+1} L_{i+1}}$ $i = 0, 2, 4, \ldots, 30$ $\Phi_{31} = \Omega_4 \sigma_{31} \lambda_{32} + L_{31} \lambda_{32} + \tau_1$

STAGE 3

$\kappa_0 = T_{cc0}^* G_{cc0}^{*7} + T_{cc0}^* T_{cc1}^8 G_{cc8}^{*15} + T_{cc0}^* T_{cc1}^{16} G_{cc16}^{*23} + T_{cc0}^* T_{cc1}^{24} \psi_{24}^{30}$ $\kappa_1 = \Omega_{3to1} T_{cc1} G_{cc1}^{*7} + \Omega_{3to1} T_{cc1}^8 G_{cc8}^{*15} + \Omega_{3to1} T_{cc1}^{16} G_{cc16}^{*23} + \Omega_{3to1} T_{cc1}^{24} \psi_{24}^{30}$ $G_1^{*i+5} = G_i^{*i+1} + T_{i+1}^{i+2} G_{i+2}^{*i+3} + T_{i+1}^{i+2} T_{i+3}^{i+4} G_{i+4}^{*i+5}$ -continued $i = 9, 15, 21$ $T_1^9 = T_1 T_2^3 T_4^5 T_6^7 T_8^9$ $T_2^9 = T_2^3 T_4^5 T_6^7 T_8^9$ $T_{12}^{15} = T_{12}^{13} T_{14}^{15}$ $T_{12}^{21} = T_{12}^{13} T_{14}^{15} T_{16}^{17} T_{18}^{19} T_{20}^{21}$ $T_{12}^{27} = T_{12}^{13} T_{14}^{15} T_{16}^{17} T_{18}^{19} T_{20}^{21} T_{22}^{23} T_{24}^{25} T_{26}^{27}$ $U_1 = \overline{G_0^* G_1^{*2}}$ $\Phi_{27}^{30} = G_{27}^{*28} + T_{28}^{29} G_{29}^{*30} + T_{28}^{29} T_{30}^{31} \Phi_{31}$

STAGE 4

$\kappa_0^* = \kappa_0 \forall \lambda_{cc0}$ $\kappa_1^* = \kappa_1 \forall \lambda_{cc1}$ $G_1^{*8} = G_1^{*2} + T_2^3 G_3^{*8}$ $\overline{G_1^{*8}} = \overline{G_1^{*2} T_2^3} + \overline{G_1^{*2} G_3^{*8}}$ $U_2 = \overline{T_1} + \overline{T_2^3 G_1^{*2}} + \overline{T_2^9 G_1^{*2} G_3^{*8}}$ $U_3 = G_0^* + T_0^1 G_1^{*2} + T_0^1 T_2^3 G_3^{*8}$ $U_4 = \overline{T_0} + \overline{G_0^* T_1} + \overline{T_2^3} U_1 + \overline{T_2^9} U_1 \overline{G_3^{*8}}$ $\Phi_9^{26} = G_9^{*14} + T_{10}^{11} T_{12}^{15} G_{15}^{*20} + T_{10}^{11} T_{12}^{21} G_{21}^{*26} + T_{10}^{11} T_{12}^{27} \Phi_{27}^{31}$

STAGE 5

Figure 3A:
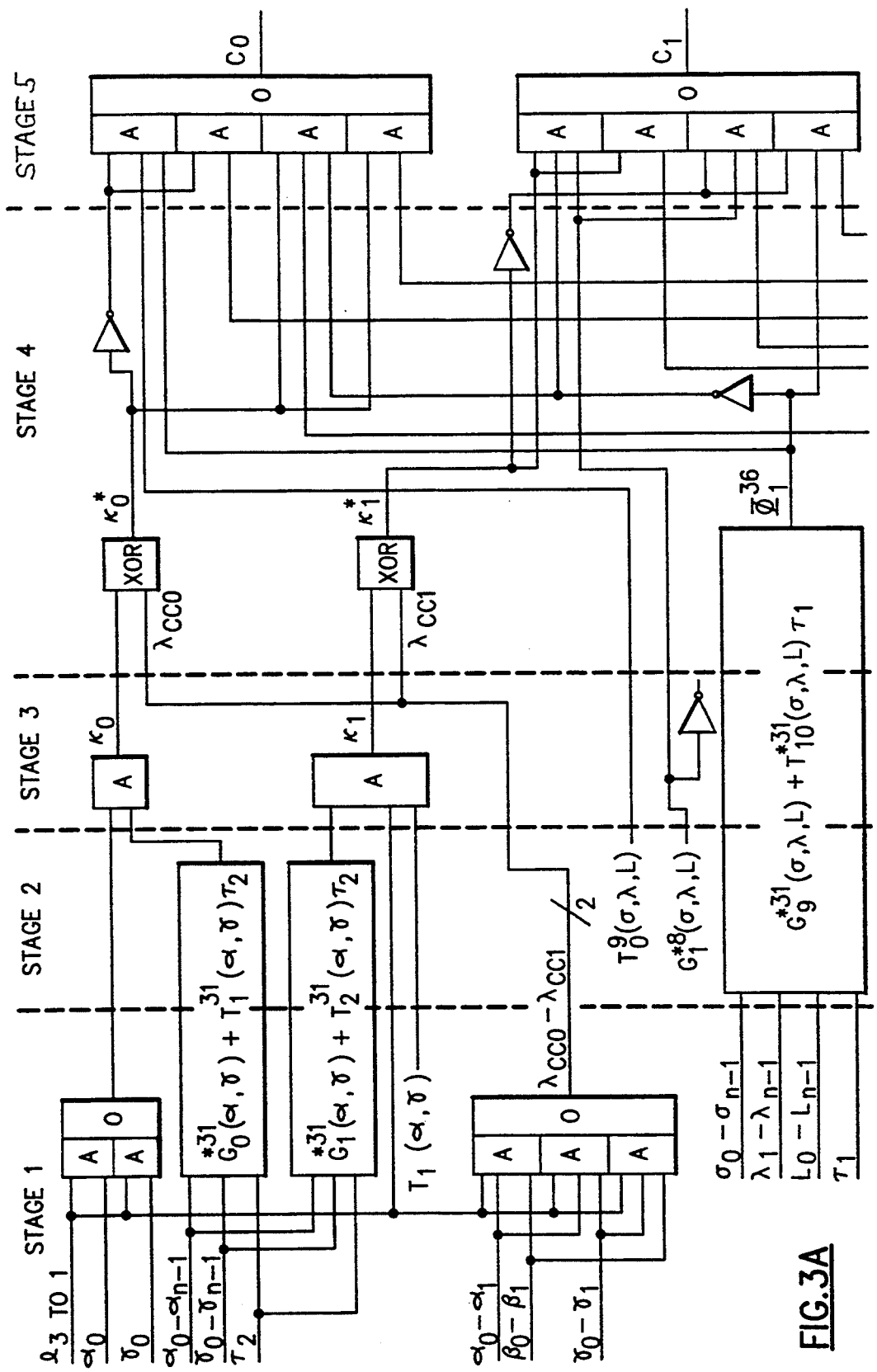
FIGS. 3, 3A, and 3B represents parallel extraction of carries for parallel prediction of status (second embodiment)
Figures 3, 3B:
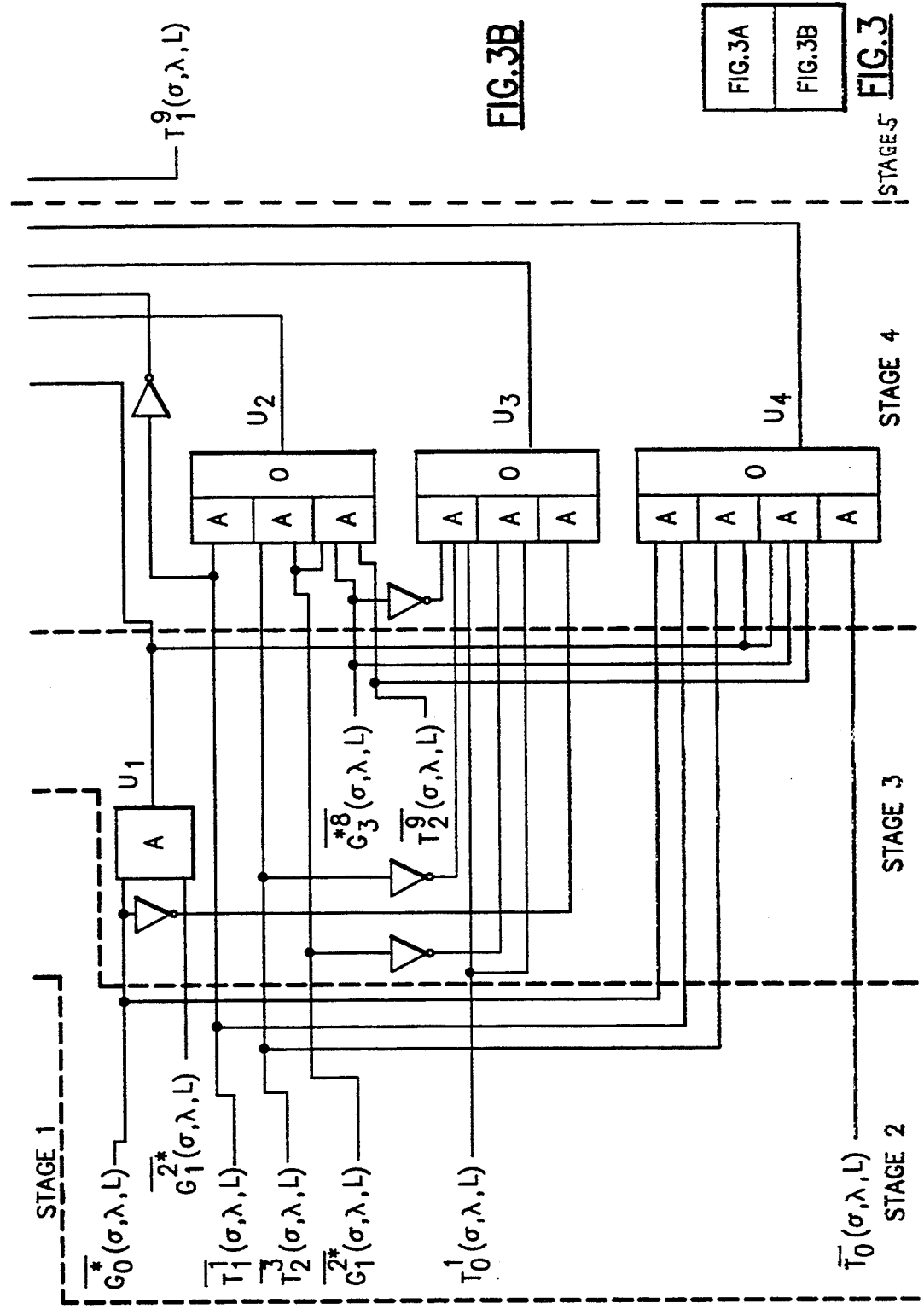

$c_1 = \kappa_1^* U_2 + \overline{\kappa_1^*} T_1 G_1^{*8} + \overline{\kappa_1^*} T_1^9 \Phi_9^{26} + \kappa_1^* \overline{G_1^{*8}} \Phi_9^{26}$ $c_0 = \kappa_0^* U_4 + \overline{\kappa_0^*} U_3 + \kappa_0^* U_1 \overline{\Phi_9^{26}} + \overline{\kappa_0^*} T_0^9 \Phi_9^{26}.$ The logic diagram for the generation of $c_0$ and $c_1$ for the second implementation scheme are depicted in FIG. 3.

Generation of Overflow

In the previous section, the implementation for extracting carries due to the execution of only the second of an interlocked pair of instructions was presented for the two ALU implementation schemes. The carries into and out of the MSB were shown to be calculable in five stages using the assumed bookset. It is well known that arithmetic overflow can be determined for two's complement addition by the EXCLUSIVE-OR between the carry into and out of the MSB. Therefore, overflow due only to the execution of the second instruction can be produced from the EXCLUSIVE-OR between $c_0$ and $c_1$. Using this approach, overflow can be generated in six stages of the assumed bookset since $c_0$ and $c_1$ are generated in five. This would result in the critical path for the ALU. In this section, an earlier generation of overflow is pursued. First, developments that are common to both implementation schemes are presented. Next the first implementation scheme is considered with an implementation for the assumed bookset presented. Finally, the implementation for the second ALU implementation scheme is developed.

From the signals described in the previous section, overflow can be computed explicitly by:

$$OF = \kappa_0 \forall \kappa_1 \forall \lambda_{cc0} \forall \lambda_{cc1} \forall \phi_0 \forall \phi_1.$$

The EXCLUSIVE-OR of two carries in a binary adder, $\Phi_0$ and $\Phi_1$ using a conventional CLA is equal to:

$$\theta_0 \forall \theta_1 = \overline{T_0} \theta_1 + G_0^* \overline{\theta_1}.$$

These results are directly applicable to the EXCLUSIVE-OR between $\kappa_0$ and $\kappa_1$ because they are derived by an implicit, conventional CLA, but the results are not directly applicable to the EXCLUSIVE-OR between $\phi_0$ and $\phi_1$ since the inputs to the CLA producing them have been modified. Thus, $\kappa_0 \ \kappa_1$ can be expressed as:

$$\kappa_0 \forall \kappa_1 = \overline{T_{cc0}} \kappa_1 + G_{cc0}^* \overline{\kappa_1},$$

but a more general expression must be used for expressing $\phi_0 \forall \phi_1$. To develop this expression, $\phi_0$ needs to be expressed in terms of $\phi_1$. Given (according to Int. J. Elec. Vol. 67, No. 2, supra) that:

$$\phi_0 = T_0 G_0^* + \overline{T_0} \phi_1.$$

$$\phi_0 \forall \phi_1 = (T_0 G_0^* + \overline{T_0} \phi_1) \forall \phi_1.$$

Expanding the EXCLUSIVE-OR into its canonical sum of products yields:

$$\phi_0 \forall \phi_1 = \overline{(T_0 G_0^* + \overline{T_0} \phi_1)} \phi_1 + (T_0 G_0^* + \overline{T_0} \phi_1) \overline{\phi_1}$$
$$= \overline{T_0 G_0^*} \cdot \overline{\overline{T_0} \phi_1} \phi_1 + T_0 G_0^* \overline{\phi_1}$$
$$= (\overline{T_0} + \overline{G_0^*})(T_0 + \overline{\phi_1}) \phi_1 + T_0 G_0^* \overline{\phi_1}$$
$$= (\overline{T_0} + \overline{G_0^*} \overline{\phi_1}) \phi_1 + T_0 G_0^* \overline{\phi_1}$$
$$= \overline{T_0} \phi_1 + T_0 G_0^* \overline{\phi_1}.$$

Further development of these expressions to derive an expression for overflow is contingent upon the ALU implementation being considered since the expressions for $\lambda_{cc0}$, $\lambda_{cc1}$, $T_0$ and $G_0^*$ differ for the two implementation schemes. The expression for overflow for each of these schemes is developed below. Before deriving these expressions, the following theorem, which will be useful in the derivations, is proven:

Theorem 1

If a, b, c, and d are Boolean variables, then $$(\overline{abd + a\overline{b}d}) \forall c = (\overline{ab} + ab)d \forall (ac + \overline{b}c + \overline{a}bc)$$

Proof:

$$(\overline{abd} + a\overline{b}d) \forall c = \overline{[(a \forall b)(ab)]d + (a \forall b)ab + a\overline{b}d} \forall c$$
$$= \{\overline{(a \forall b)d ab} + [(a \forall b) + \overline{d}]ab\} \forall c$$
$$\{\overline{(a \forall b)d ab} + [(a \forall b)d]ab\} \forall c$$
$$= [\overline{(a \forall b)d}] \forall (ab) \forall c$$

-continued $$(\overline{ab} + ab)d \forall (ac + \overline{b}c + a\overline{b}c)$$

QED

Generation of Overflow for the First Implementation Scheme

In this implementation scheme, $\lambda_{cc0}$ is equivalent to $\lambda_0$. Therefore, $$\kappa_0 \forall \kappa_1 \forall \lambda_{cc0} = \kappa_0 \forall \kappa_1 \forall \lambda_0$$
$$= \overline{(\alpha_0 \forall \gamma_0)} \kappa_1 \forall (\beta_0(\alpha_0 \forall \gamma_0)).$$

Substituting this result into the expression for overflow produces:

$$OF = \overline{(\overline{(\alpha_0 \forall \gamma_0)} \kappa_1)} \forall (\beta_0(\alpha_0 \forall \gamma_0)) \forall \lambda_{cc1} \forall \phi_0 \forall \phi_1.$$

Now consider $\phi_0 \forall \phi_1$. From the above developments, this can be expressed as:

$$\phi_0 \forall \phi_1 = \overline{T_0} \phi_1 + T_0 G_0^* \overline{\phi_1}$$

Since the inputs to the CLA for this implementation scheme have been modified so that one of the inputs is fed the carry from the CSA and the output of the logic function block from which it must select the appropriate signal while the other input is fed the sum, the expressions for $T_0$ and $G_0^*$ will differ from those for a conventional CLA. The expressions for these signals for this implementation scheme at bit position 0 are:

$$T_0 = \sigma_0 + \lambda_1 L_0$$

$$G_0^* = \sigma_0(\lambda_1 + L_0).$$

Substituting these expressions into the expression for $\phi_0 \forall \phi_1$ produces:

$$\phi_0 \forall \phi_1 = \overline{T_0} \phi_1 + T_0 G_0^* \overline{\phi_1}$$
$$= \overline{(\sigma_0 + \lambda_1 + L_0)} \phi_1 + (\sigma_0 + \lambda_1 + L_0)\sigma_0(\lambda_1 + L_0) \overline{\phi_1}$$
$$= \overline{\sigma_0}\overline{(\lambda_1 + L_0)} \phi_1 + \sigma_0(\lambda_1 + L_0) \overline{\phi_1}.$$

Since $\lambda_{cc1}$ is equal to $\lambda_1$, $\phi_0 \forall \phi_1 \forall \lambda_{cc1}$ can be expressed as:

$$\phi_0 \forall \phi_1 \forall \lambda_{cc1} = \phi_0 \forall \phi_1 \forall \lambda_1$$
$$= [\overline{\sigma_0(\lambda_1 + L_0)} \phi_1 + \sigma_0(\lambda_1 + L_0) \overline{\phi_1}] \forall \lambda_1.$$

Thus by theorem 1:

$$\phi_0 \forall \phi_1 \forall \lambda_{cc1} = [\overline{\sigma_0(\lambda_1 + L_0)} + \sigma_0(\lambda_1 + L_0)]\phi_1 \forall [\overline{\sigma_0}\lambda_1 +$$
$$\overline{(\lambda_1 + L_0)}\lambda_1 + \sigma_0(\lambda_1 + L_0)\overline{\lambda_1}]$$
$$= (\overline{\sigma_0}\lambda_1 L_0 + \sigma_0 \lambda_1 + \sigma_0 L_0)\phi_1 \forall (\overline{\sigma_0}\lambda_1 + \sigma_0 L_0)$$

Substituting this expression into that for generating overflow gives:

$$OF = \overline{(\alpha_0 \forall \gamma_0)} \kappa_1 \forall \beta_0(\alpha_0 \forall \gamma_0) \forall (\overline{\sigma_0}\lambda_1 + \sigma_0 L_0 \lambda_1 + \sigma_0 L_0 \overline{\lambda_1}) \forall (\overline{\sigma_0} L_0 \lambda_1 + \sigma_0 \lambda_1 + \sigma_0 L_0) \phi_1.$$

Expressing overflow in this manner allows it to be calculable in five stages. The calculation proceeds stage by stage as follows:

STAGE 1

$$X_1 = \overline{\alpha_0 \forall \gamma_0}$$

$$X_2 = \beta_0(\alpha_0 \forall \gamma_0) = \beta_0 \alpha_0 \overline{\gamma_0} + \beta_0 \overline{\alpha_0} \gamma_0$$

STAGE 2

$$X_3 = \overline{\sigma}_0 \lambda_1 + \sigma_0 L_0$$

$$X_4 = \overline{\sigma_0 L_0 \lambda_1} + \sigma_0 \lambda_1 + \sigma_0 L_0$$

STAGE 3

$$X_5 = X_2 \forall X_3$$

$$\kappa_1 = T_{cc1} G_{cc1}^{*7} + T_{cc1}{}^8 G_{cc8}^{*15} + T_{cc1}{}^{16} G_{cc16}^{*23} + T_{cc1}{}^{24} \Psi_{24}{}^{30}$$

STAGE 4

$$X_6 = X_5 \forall X_1 \kappa_1 = X_5 \overline{X_1} + X_5 \overline{\kappa_1} + \overline{X_5} X_1 \kappa_1$$

$$\phi_1 = T_1 G_1^{*8} + T_1 T_2{}^9 G_9^{*16} + T_1 T_2{}^{17} G_{17}^{*24} + T_1 T_2{}^{25} \Phi_{25}{}^{31}$$

STAGE 5

$$OF = X_6 \forall X_4 \phi_1 = \overline{X_6} X_4 \phi_1 + X_6 \overline{X_4} + X_6 \overline{\phi_1}.$$

Figure 4:
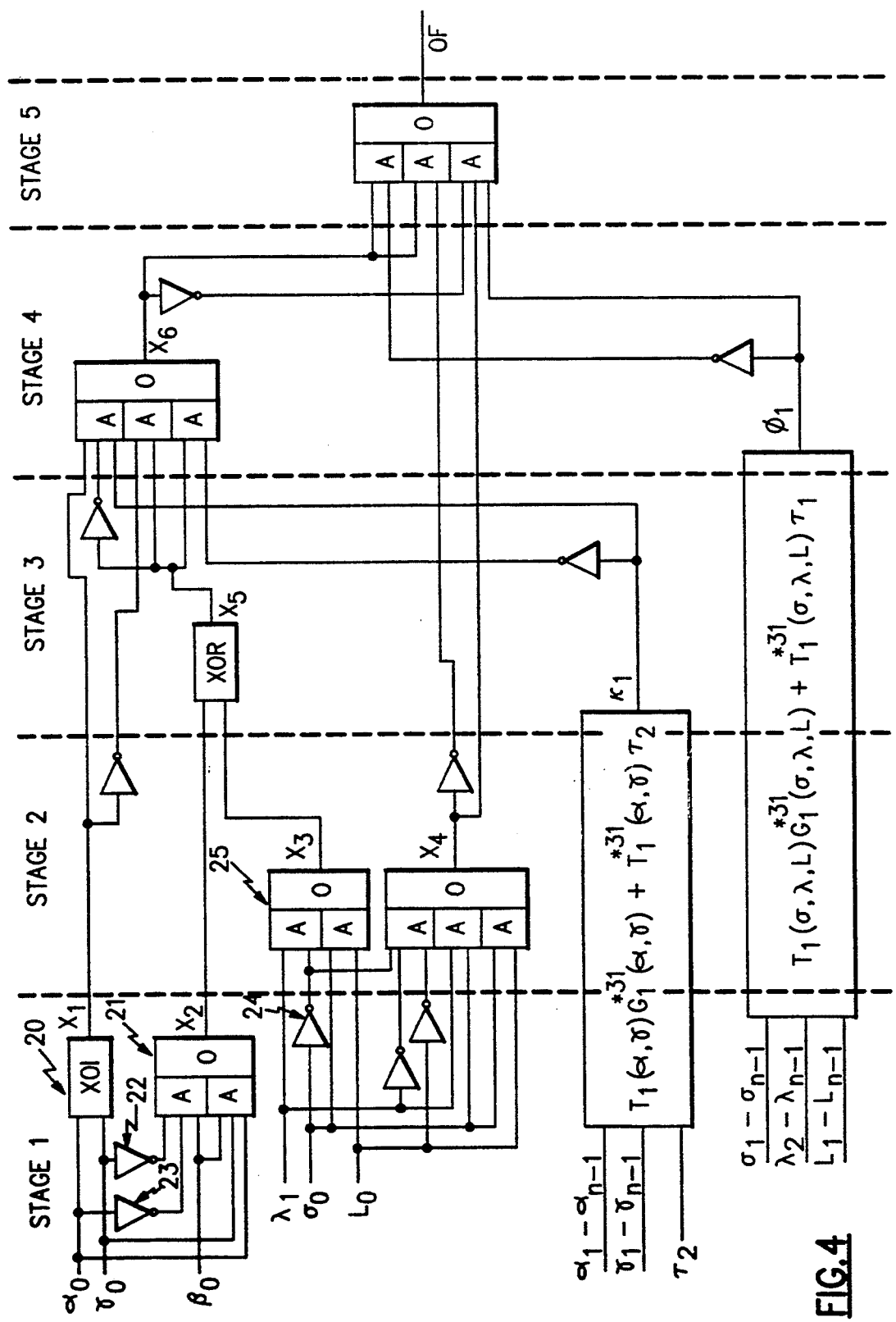
FIG. 4 represents parallel extraction of overflow for parallel prediction of status (first embodiment)

The logic diagram for the computation of overflow for the first implementation scheme is depicted in FIG. 4. For simplicity, the expressions for generating $\kappa_1$ and $\phi_1$ are given during the appropriate stage in the stage by stage description without showing the generation of their precursors. The details of the stage by stage generation of these values, can be found in the section called "Carry Extraction for the First Implementation Scheme".

Generation of Overflow for the Second Implementation Scheme

In the second implementation scheme, $\lambda_{cc0}$ and $\lambda_{cc1}$ can be expressed in terms of $\lambda_0$ and $\lambda_1$ as:

$$\lambda_{cc0} = \Omega_{3\ to\ 1} \lambda_0$$

$$\lambda_{cc1} = \Omega_{3\ to\ 1} \lambda_1.$$

In addition, the carries produced due to the first operation, $\kappa_0$ and $\kappa_1$ are generated by gating the corresponding expressions with a signal indicating that a three-to-one addition is being executed. Let the ungated signals be designated as $\kappa_0^+$ and $\kappa_1^+$. Then $\kappa_0$ and $\kappa_1$ can be expressed as:

$$\kappa_0 = \Omega_{3\ to\ 1} \kappa_0^+$$

$$\kappa_1 = \Omega_{3\ to\ 1} \kappa_1^+.$$

Using this notation, overflow can be expressed as:

$$OF = \kappa_0 \forall \kappa_1 \forall \lambda_{cc0} \forall \lambda_{cc1} \forall \phi_0 \forall \phi_1$$

$$= \Omega_{3to1} \kappa_0^+ \forall \Omega_{3to1} \kappa_1^+ \forall \Omega_{3to1} \lambda_0 \forall \lambda_{cc1} \forall \phi_0 \forall \phi_1.$$

Since.

$$AB \forall AD = A(B \forall D),$$

$$OF = [\Omega_{3\ to\ 1}(\kappa_0^+ \forall \kappa_1^+ \forall \lambda_0)] \forall \lambda_{cc1} \forall \phi_0 \forall \phi_1.$$

Making use of the expression for $\kappa_0 \forall \kappa_1 \forall \lambda_0$ and using the assumed terminology gives:

$$\kappa_0^+ \forall \kappa_1^+ \forall \lambda_0 = (\overline{\alpha_0 \forall \gamma_0}) \kappa_1^+ \forall \beta_0(\alpha_0 \forall \gamma_0),$$

so that:

$$OF = \{\Omega_{3to1}[(\overline{\alpha_0 \forall \gamma_0}) \kappa_1^+ \forall \beta_0(\alpha_0 \forall \gamma_0)]\} \forall \lambda_{cc1} \forall \phi_0 \forall \phi_1$$

$$= \Omega_{3to1}(\overline{\alpha_0 \forall \gamma_0}) \kappa_1^+ \forall \Omega_{3to1} \beta_0(\alpha_0 \forall \gamma_0) \forall \lambda_{cc1} \forall \phi_0 \forall \phi_1$$

$$= (\overline{\alpha_0 \forall \gamma_0}) \kappa_1 \forall \Omega_{3to1} \beta_0(\alpha_0 \forall \gamma_0) \forall \lambda_{cc1} \forall \phi_0 \forall \phi_1.$$

Now consider the expression $\phi_0 \forall \phi_1$, which, from above, can be expressed as:

$$\phi_0 \forall \phi_1 = \overline{T_0} \phi_1 + T_0 G_0^* \overline{\phi_1}.$$

As for the first implementation scheme, the pseudo-generate and transmit at bit position 0 differ from those of a conventional CLA since the inputs to the CLA have been modified in this implementation. The expression for these values is from U.S. Pat. No. 5,299,319 Phillips et al., supra.:

$$T_0 = \lambda_1 + \Omega_4 \sigma_0 + L_0$$

$$G_0^* = \Omega_4 \lambda_1 \sigma_0 + \lambda_1 L_0$$

where $\Omega_4$ is a control signal to zero the sum from the CSA when it is not required to execute the specified function. Substituting these into the expression for $\phi_0 \forall \phi_1$ yields:

$$\phi_0 \forall \phi_1 = \overline{T_0} \phi_1 + T_0 G_0^* \overline{\phi_1}$$

$$= \overline{(\lambda_1 + \Omega_4 \sigma_0 + L_0)} \phi_1 +$$

$$(\lambda_1 + \Omega_4 \sigma_0 + L_0)(\Omega_4 \sigma_0 \lambda_1 + L_0 \lambda_1) \overline{\phi_1}$$

$$= \overline{\lambda_1 (\Omega_4 \sigma_0 + L_0)} \phi_1 +$$

$$(\lambda_1 + \Omega_4 \sigma_0 + L_0) \lambda_1 (\Omega_4 \sigma_0 + L_0) \overline{\phi_1}$$

$$= \overline{\lambda_1 (\Omega_4 \sigma_0 + L_0)} \phi_1 + \lambda_1 (\Omega_4 \sigma_0 + L_0) \overline{\phi_1}.$$

Therefore, $\phi_0 \forall \phi_1 \forall \lambda_{cc1}$ can be expressed as:

$$\phi_0 \forall \phi_1 \forall \lambda_{cc1} = [\overline{\lambda_1(\Omega_4 \sigma_0 + L_0)} \phi_1 + \lambda_1(\Omega_4 \sigma_0 + L_0) \overline{\phi_1}] \forall \lambda_{cc1}.$$

Let, $$\nu = \Omega_4 \sigma_0 + L_0,$$

then by theorem 1:

$$\phi_0 \forall \phi_1 \forall \lambda_{cc1} = \overline{(\lambda_1\bar{\nu} + \lambda_1\nu)\phi_1} \forall (\overline{\lambda_1}\lambda_{cc1} + \lambda_{cc1}\bar{\nu} + \lambda_1\overline{\lambda_{cc1}}\nu),$$
$$= \overline{(\lambda_1\forall\nu)}\phi_1 \forall (\overline{\lambda_1}\lambda_{cc1} + \lambda_{cc1}\bar{\nu} + \lambda_1\overline{\lambda_{cc1}}\nu),$$

so that:

$$\phi_0 \forall \phi_1 \forall \lambda_{cc1} = [\overline{(\lambda_1\forall\nu)}\phi_1] \forall (\overline{\lambda_1}\lambda_{cc1} + \lambda_{cc1}\bar{\nu} + \lambda_1\overline{\lambda_{cc1}}\nu).$$

Substituting this expression into that for overflow gives:

$$OF = \overline{(\alpha_0 \forall \gamma_0)\kappa_1 \forall \Omega_{3to1}\beta_0(\alpha_0 \forall \gamma_0)} \forall \overline{(\lambda_1 \forall \nu)}\phi_1 \forall (\overline{\lambda_1}\lambda_{cc1} + \lambda_{cc1}\bar{\nu} + \lambda_1\overline{\lambda_{cc1}}\nu)$$
$$= \overline{(\alpha_0 \forall \gamma_0)\kappa_1 \forall \Omega_{3to1}\beta_0(\alpha_0 \forall \gamma_0)} \forall (\overline{\lambda_1}\lambda_{cc1} + \lambda_{cc1}\bar{\nu} + \lambda_1\overline{\lambda_{cc1}}\nu) \forall \overline{(\lambda_1 \forall \nu)}\phi_1.$$

In the section called "Carry Extraction for the Second Implementation Scheme" it was shown that $\phi_1$ can not be generated in four stages using the assumed bookset for this implementation scheme. Thus, if overflow is to be implemented in five stages, it must be implemented without the explicit calculation of $\phi_1$. Also in "Carry Extraction for Second Implementation Scheme" the expression for $\phi_1$ that could be available by the fifth stage was:

$$\phi_1 = T_1G_1^{*8} + T_1T_2^9\Phi_9^{26}.$$

Assume for the moment that:

$$\overline{(\alpha_0 \forall \gamma_0)\kappa_1 \forall \Omega_{3to1}\beta_0(\alpha_0 \forall \gamma_0)} \forall (\overline{\lambda_1}\lambda_{cc1} + \lambda_{cc1}\bar{\nu} + \lambda_1\overline{\lambda_{cc1}}\nu)$$

can be generated by the fourth stage. Let this value be designated as $X_8$. In addition, assume that $\overline{\lambda_1 \forall \nu}$ can be generated by the fourth stage and let it be designated by $X_d$. That these conditions are true will be shown in the stage-by-stage implementation to follow. With these assumptions, OF can be calculated as:

$$OF = X_8 \forall X_d(T_1G_1^{*8} + T_1T_2^9\Phi_9^{26}).$$

By distributing $X_d$ this expression becomes:

$$OF = X_8 \forall (X_dT_1G_1^{*8} + X_dT_1T_2^9\Phi_9^{26}).$$

Let $$X_6 = X_dT_1$$
$$X_9 = X_dT_1T_2^9,$$

then, $$OF = X_8 \forall (X_6G_1^{*8} + X_9\Phi_9^{26}).$$

This expression can be developed by expanding the EXCLUSIVE-OR and applying Boolean identities as follows.

$$OF = \overline{X_8}X_6G_1^{*8} + \overline{X_8}X_9\Phi_9^{26} + X_8\overline{(X_6G_1^{*8} + X_9\Phi_9^{26})}$$

$$= \overline{X_8}X_6G_1^{*8} + \overline{X_8}X_9\Phi_9^{26} + X_8\overline{X_6G_1^{*8}}\cdot\overline{X_9\Phi_9^{26}}$$

$$= \overline{X_8}X_6G_1^{*8} + \overline{X_8}X_9\Phi_9^{26} + X_8(\overline{X_6} + \overline{G_1^{*8}})(\overline{X_9} + \overline{\Phi_9^{26}})$$

$$= \overline{X_8}X_6G_1^{*8} + \overline{X_8}X_9\Phi_9^{26} + X_8\overline{X_6}\overline{X_9} + X_8\overline{X_9}\overline{G_1^{*8}} +$$
$$X_8\overline{X_6}\overline{\Phi_9^{26}} + X_8\overline{G_1^{*8}}\overline{\Phi_9^{26}}$$

$$= X_8\overline{X_9}(\overline{X_6} + \overline{G_1^{*8}}) + \overline{X_8}X_6G_1^{*8} + \overline{X_8}X_9\Phi_9^{26} +$$
$$X_8(\overline{X_6} + \overline{G_1^{*8}})\overline{\Phi_9^{26}}.$$

This expression is implementable in the fifth stage if $X_6+G_1^{*8}$, $X_6$, $X_9$, and $X_8$ can be generated by the fourth stage. The other values were shown to be implementable by the fourth stage in "Carry Extraction for the Second Implementation Scheme".

First, consider the generation of $X_6$ which is:

$$X_6 = X_dT_1$$
$$= \overline{(\lambda_1 \forall \nu)}T_1.$$

But $\nu$ is:

$$\nu = \Omega_4\sigma_0 + L_0.$$

Since $\Omega_4$ is a control signal input to the ALU and $\sigma_0$ and $L_0$ are both calculated in the first stage of the ALU, then $\nu$ can be calculated in the second stage. Also, $T_1$ as well as $\lambda_1$ were shown previously to be calculable by the second stage. Therefore, $X_6$ can be calculated in the third stage by:

$$X_6 = \overline{(\lambda_1 \forall \nu)}T_1$$
$$= \lambda_1\nu T_1 + \overline{\lambda_1}\overline{\nu}T_1.$$

$X_9$ which is $X_6T_2^9$ is calculable in the fourth stage since $X_6$ and $T_2^9$ are calculated in the third stage.

Next consider the generation of $\overline{X_6}+\overline{G_1^{*8}}$. The generation of $G_1^{*8}$ has been discussed previously. Making use of these results and denoting $\overline{X_6}+\overline{G_1^{*8}}$ as $X_{10}$ gives:

$$X_{10} = \overline{X_6} + \overline{(G_1^{*2} + T_2^3G_3^{*8})}$$
$$= \overline{X_6} + \overline{G_1^{*2}}\overline{T_2^3} + \overline{G_1^{*2}}\overline{G_3^{*8}}.$$

All of the values in this expression have been shown previously to be calculable in three stages; therefore, $X_{10}$ can be calculated in the fourth stage.

To show that OF can be generated in five stages, it remains to show that $X_8$ can be generated in four stages. The four stage generation of $X_8$ is as follows:

STAGE 1

$$X_1 = \overline{\alpha_0 \forall \gamma_0}$$

$$X_2 = (\alpha_0 \forall \gamma_0)$$

STAGE 2

$$X_3 = \Omega_{3to1}\beta_0X_2$$

$$X_4 = \overline{\lambda_1}\lambda_{cc1} + \lambda_{cc1}\bar{\nu}$$

-continued $$= \overline{\lambda_1}\lambda_{cc1} + \lambda_{cc1}(\overline{\Omega_4\sigma_0 + L_0})$$

$$= \overline{\lambda_1}\lambda_{cc1} + \lambda_{cc1}\overline{\Omega_4 L_0} + \lambda_{cc1}\overline{\sigma_0 L_0}$$

$$X_5 = \overline{\lambda_{cc1}\nu}$$

$$= \overline{\lambda_{cc1}\Omega_4\sigma_0} + \overline{\lambda_{cc1}L_0}$$

STAGE 3

$$X_6 = \lambda_1 \nu T_1 + \overline{\lambda_1 \nu T_1}$$

$$X_7 = X_3 \forall (X_4 + \lambda_1 X_5)$$

$$= \overline{X_3}X_4 + \overline{X_3}\lambda_1 X_5 + \overline{X_3 X_4 \lambda_1} + \overline{X_3 X_4 X_5}$$

STAGE 4

$$X_8 = X_1\kappa_1 \forall X_7$$

$$= X_1\kappa_1\overline{X_7} + \overline{X_1}X_7 + \overline{\kappa_1}X_7$$

$$X_9 = T_2{}^9 X_6$$

$$X_{10} = \overline{X_6} + \overline{G_1^{*2}T_2^3} + \overline{G_1^{*2}G_3^{*8}}.$$

In this presentation, the calculation of $\kappa_1$ that occurs in stage 3 was omitted since it has been shown earlier how this occurs. With the above values, OF can be calculated in the fifth stage as:

STAGE 5

$$\underline{OF = X_8\overline{X_9}X_{10} + \overline{X_8}X_6G_1^{*8} + \overline{X_8}X_9\Phi_9^{26} + X_8X_{10}}$$
$$\Phi_9^{26}.$$

Figure 5A:
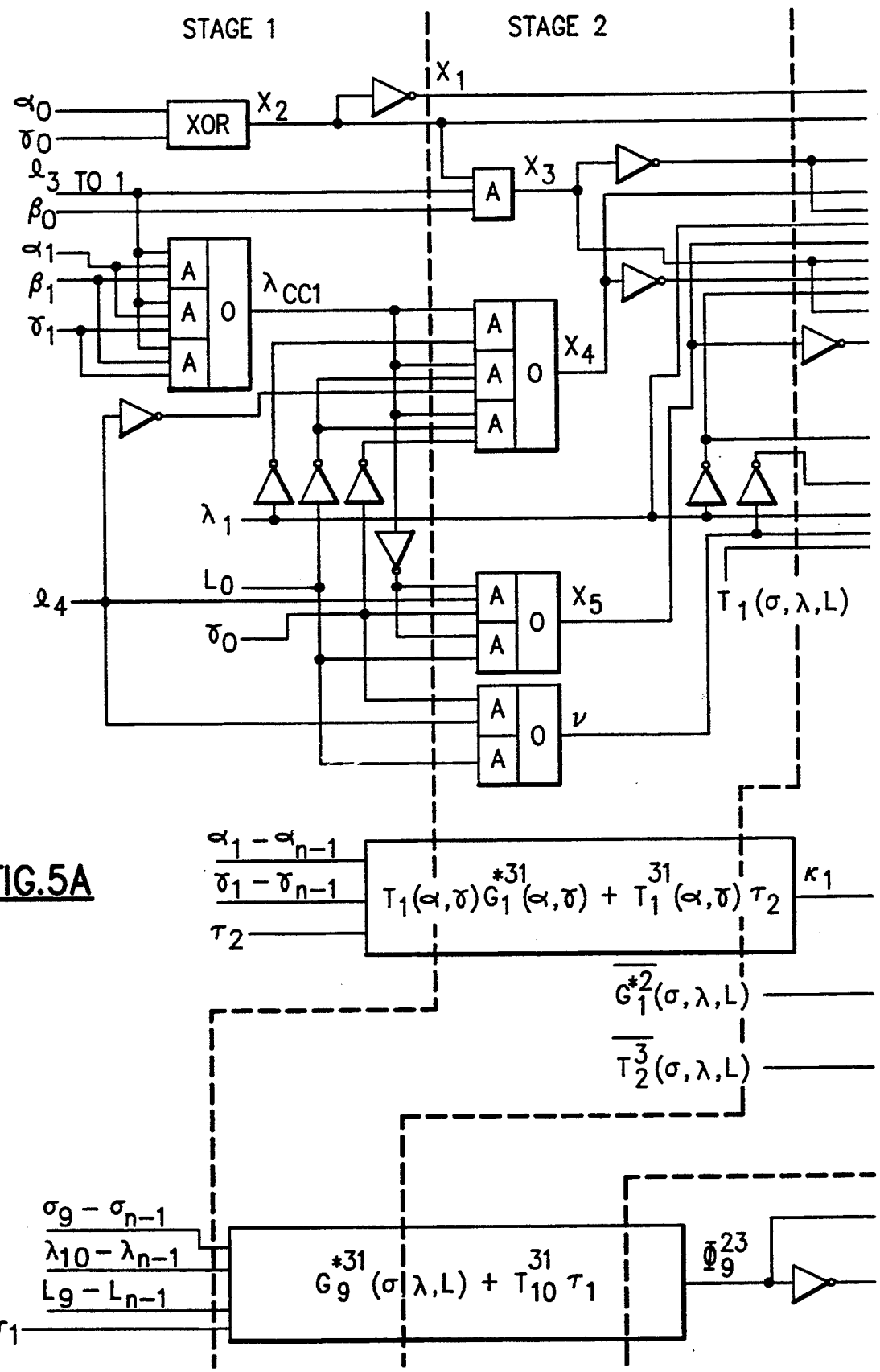
FIGS. 5, 5A, and 5B represents parallel extraction of overflow for parallel prediction of status (second embodiment)
Figures 5, 5B:
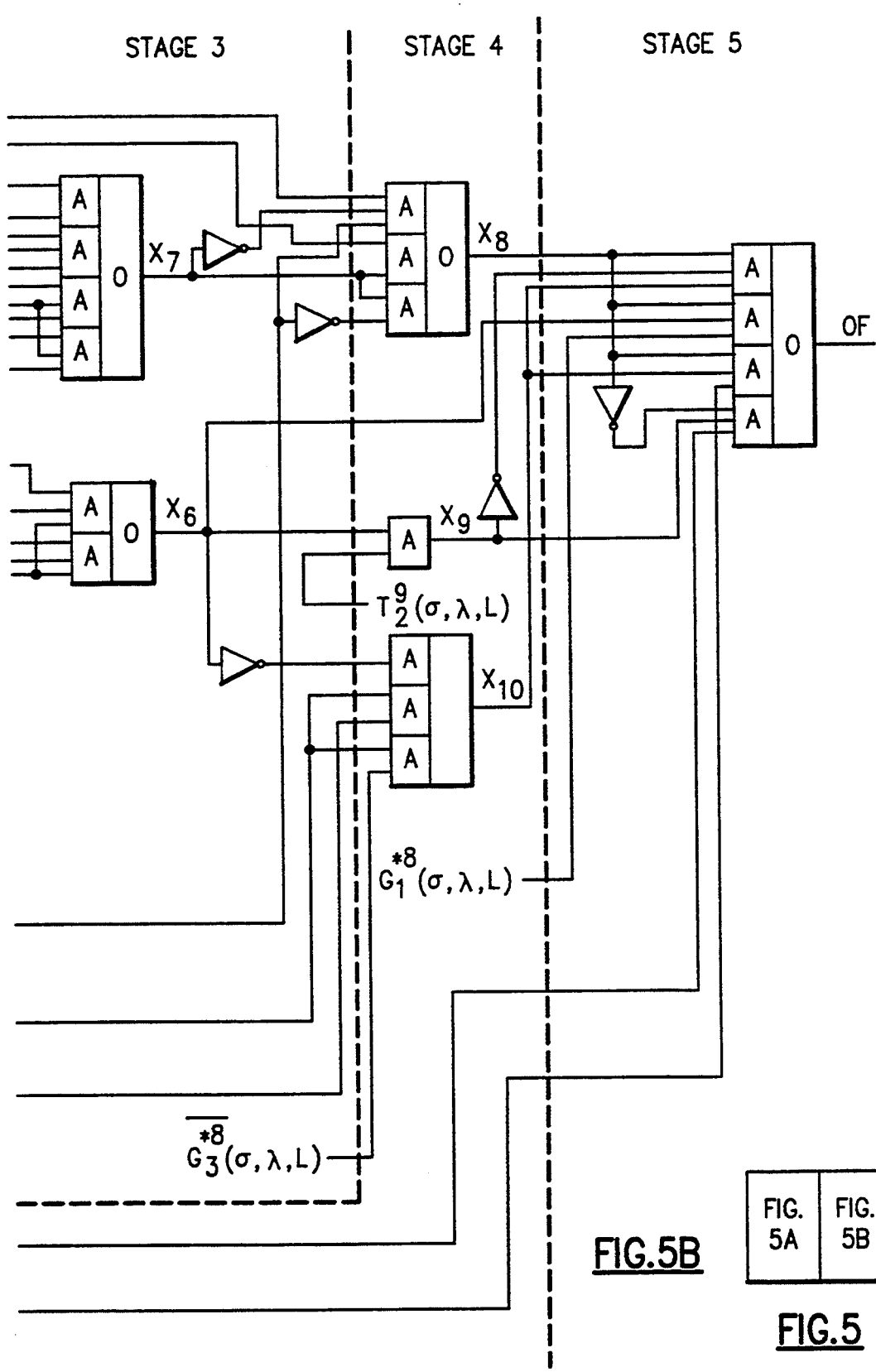

The logic diagram for generating overflow for the second implementation scheme is shown in FIG. 5.

Result Equal Zero Determination

The detection of result equal zero consists of two pads. The first pad is the actual determination that $\Lambda_i$, the ALU output, for $0 \leq i \leq 31$ is zero for each and every i. This determination will be denoted by $R_{=0}$. The second part is the qualification of $R_{=0}$ to account for overflow conditions. The method of detecting $R_{=0}$ depends upon whether or not the ALU supports the collapsing of interlocks between two instructions in which both specify an ALU operation with the second specifying a logical operation. If collapsing of such interlocks is supported, case 1, the detection of $R_{=0}$ is direct from the result. If the collapsing of such interlocks is not supported, case 2, $R_{=0}$ can be predicted; thereby, allowing the determination of $R_{=0}$ earlier in the execution cycle.

For case 1, the determination of $R_{=0}$ is performed directly on the results from the ALU. $\Lambda_i$. This output has been shown to be obtainable in five stages (U.S. Ser. No. 504,910, supra.). The result is zero if each and every bit of the results zero. This can be expressed as:

$$R_{=0} = \overline{\Lambda_0\Lambda_1\Lambda_2 \ldots \Lambda_{31}};$$

a 32-way AND between all of the inverted ALU output bits. This expression can be implemented in two stages with an eight-way AND gate followed by a four-way AND gate. Alternatively, $R_{=0}$ can be expressed as:

$$R_{=0} = \overline{(\Lambda_0 + \ldots + \Lambda_7)(\Lambda_8 + \ldots + \Lambda_{15})(\Lambda_{16} + \ldots + \Lambda_{23})(\Lambda_{24} + \ldots + \Lambda_{31})}.$$

Expressing $R_{=0}$ in this manner allows its generation by eight-way OI gates followed by a four-way AND gate and avoids the requirement of the generation of the one's complement of the result, $\Lambda_i$. In either case, $R_{=0}$ can be generated in seven stages with the assumed bookset since the result can be generated in five.

As mentioned above, if the collapsing of particular interlocks is not supported in the ALU the detection of $R_{=0}$ can be predicted. A development of such a prediction scheme for the three-to-one ALU follows.

The functions required in the ALU can be divided into four categories (see U.S. Ser. No. 07/504,910, and Phillips, et al. supra.) These categories are:

| | |
|---|---|
| A+B+Γ | Arithmetic followed by Arithmetic |
| B+(A LOP Γ) | Logical followed by Arithmetic |
| B LOP (A+Γ) | Arithmetic followed by Logical |
| B LOP (A LOP Γ) | Logical followed by Logical. |

Two of these categories, three and four, occur when interlocks are collapsed between two instructions which both specify an ALU operation with the second instruction specifying a logical operation. In these categories, the output of the adder is modified by a logical operation. No method is known for generating $R_{=0}$ early for these conditions. Therefore, if the early generation of $R_{=0}$ is desired, collapsing of interlocks between instruction sequences in which these functions arise can not be supported by the ALU. These instructions sequences must be issued and executed serially. As a result, only the functions contained in the first two categories of the above list need to be considered when considering the early generation of $R_{=0}$. In the following, the early prediction scheme is first applied to the first category in which a three-to-one addition is executed. These results will then be extended to cover the second category contained in the above list.

Implied in three-to-one addition given in the first category are the addition of two operands and subtraction of a third operand, the subtraction of two operands from a third operand as well as the addition of three operands. These functions can be represented as:

$$A + B + \Gamma$$

$$A + B - \Gamma$$

$$A - B + \Gamma$$

$$A - B - \Gamma$$

in which + represents addition, − represents subtraction and A, B, and Γ are the three operands. By representing each operand as a two's complement number, these functions can be rewritten as:

$$A + B + \Gamma$$

$$A + B + (\overline{\Gamma} + 1)$$

$$A+(\overline{B}+1)+\Gamma$$

$$A+(\overline{B}+1)+(\overline{\Gamma}+1)$$

or, $$A+B+\Gamma$$

$$A+B+\overline{\Gamma}+1$$

$$A+\overline{B}+1+\Gamma$$

$$A+\overline{B}+1+\overline{\Gamma}+1.$$

By using the notation B* to denote either the operand or the one's complement of the operand as required by the operation to be performed, these functions can be expressed as:

$$A+B^*+\Gamma^*+\tau_2+\tau_1$$

where $\tau_2$ and $\tau_1$ are either 0 or 1 as required by the operation. By the additive identity, this expression is equivalent to:

$$A+B^*+\Gamma^*+\tau_2-1+\tau_1+1.$$

The first three terms of the expression:

$$A+B^*+\Gamma^*$$

can be considered as a three-to-two addition represented as:

$$\begin{array}{c} A_0A_1\ldots A_{31} \\ B_0^*B_1^*\ldots B_{31}^* \\ \underline{\Gamma_0^*\Gamma_1^*\ldots \Gamma_{31}^*} \\ \sigma_0\sigma_1\ldots \sigma_{31} \\ \lambda_0\lambda_1\lambda_2\ldots \lambda_{31}. \end{array}$$

Since $\tau_2$ is either 1 or 0, it can be expressed as:

$$0\ 0\ldots\tau_2.$$

Therefore, since the carry, $\lambda$, is shifted one bit to the left before being added to the sum, $\sigma$, $\tau_2$ can be added to the carry as:

$$\begin{array}{c} \lambda_0\lambda_1\ldots \lambda_{31} \\ \underline{0\ldots 0\ \tau_2} \\ \lambda_0\lambda_1\ldots \lambda_{31}\tau_2. \end{array}$$

Using this result, the expression $A+B^*+\Gamma^*+\tau_2$ can be generated as:

$$\begin{array}{c} A_0A_1\ldots A_{31} \\ B_0^*B_1^*\ldots B_{31}^* \\ \underline{\Gamma_0^*\Gamma_1^*\ldots \Gamma_{31}^*} \\ \sigma_0\sigma_1\ldots \sigma_{31} \\ \lambda_0\lambda_1\lambda_2\ldots \tau_2. \end{array}$$

In two's complement notation, a negative one is represented as a string of one's, i.e. as:

$$1\ 1\ldots 1.$$

Thus, $A+B^*+\Gamma^*+\tau_2-1$ can be expressed as a series of two three-to-two additions as:

$$\begin{array}{c} A_0A_1\ldots A_{31} \\ B_0^*B_1^*\ldots B_{31}^* \\ \underline{\Gamma_0^*\Gamma_1^*\ldots \Gamma_{31}^*} \\ \sigma_0\sigma_1\ldots \sigma_{31} \\ \lambda_0\lambda_1\lambda_2\ldots \tau_2. \\ \underline{1\ 1\ldots 1} \\ P_{x0}P_{x1}\ldots P_{x31} \\ P_{y0}P_{y1}\ldots P_{y31} \end{array}$$

thereby producing two variables $P_x$ and $P_y$.

Since the two's complement representation for $\tau_1$ is:

$$0\ 0\ldots\tau_1,$$

$A+B^*+\Gamma^*+\tau_2-1+\tau_1$ can be computed by $P_x+P_y+\tau_1$. $P_y$ and $\tau_1$ can be added in a manner similar to that in which $\lambda$ and $T_2$ were added to give:

$$\begin{array}{c} P_{y0}P_{y1}\ldots P_{y31} \\ \underline{0\ldots 0\ \tau_1} \\ P_{y0}P_{y1}\ldots P_{y31}\ \tau_1. \end{array}$$

Thus, the ultimate result from the three-to-one addition can be produced by the two-to-one addition of $P_x$ and $(P_y+\tau_1)$. This addition can be represented as:

$$\begin{array}{c} P_{x0}P_{x1}\ldots P_{x31} \\ \underline{P_{y0}P_{y1}P_{y2}\ldots \tau_1} \\ X\ S_0S_1\ldots S_{31} \end{array}$$

where S is the ultimate result of the operation $A+B^*+\Gamma^*+\tau_2+\tau_1-1$. For this two-to-one addition, 1 is supplied as the carry in. The ultimate result is zero if $S_i$, is 0 for all $0\leq i\leq 31$.

The generation of the ultimate result, $A+B^*+\Gamma^*+\tau_2+\tau_1+1-1$, as described above can be summarized as follows:

$$\begin{array}{c} A_0A_1\ldots A_{31} \\ B_0^*B_1^*\ldots B_{31}^* \\ \underline{\Gamma_0^*\Gamma_1^*\ldots \Gamma_{31}^*} \\ \sigma_0\sigma_1\ldots \sigma_{31} \\ \lambda_0\lambda_1\lambda_2\ldots \tau_2. \\ \underline{1\ 1\ 1\ldots 1} \\ P_{x0}P_{x1}\ldots P_{x30}P_{x31} \\ P_{y0}P_{y1}P_{y2}\ldots P_{y31}\ \tau_1 \\ \underline{0\ 0\ 0\ldots 0\ \ 1} \\ X\ S_0\ S_1\ldots S_{30}\ S_{31}. \end{array}$$

The advantages of representing the three-to-one addition operations in the fashion just described should become evident in the discussions to follow.

The advantages of the above representation result from the theorems to follow. For simplicity of exposition, let $P_{y32}=\tau_1$ and let $P_{x0}P_{x1}\ldots P_{x31}$ be denoted by $P_x$ and $P_{y1}P_{y2}\ldots P_{y31}P_{y32}$ be denoted by $P_y$.

Theorem 1:

If $S_i=0$, then the carry at position i, $\phi_1$, generated by the addition of $P_x$, $P_y$, and 1 is equal to 1 for all $0 \leq i \leq 31$.

Proof:

Theorem 1 can be proven by induction.

Base of induction

The expression for the sum at bit position 31 is:

$$S_{31} = P_{x31} \veebar P_{y32} \veebar 1$$
$$= P_{x31} \veebar P_{y32}$$

Assuming that $S_{31}=0$, then $$\overline{P_{x31} \veebar P_{y32}} 0,$$

therefore, $$P_{x31} \veebar P_{y32} = 1.$$

The carry produced at bit position 31, $\phi_{31}$, is:

$$\phi_{31} = P_{x31}P_{y32} + P_{x31}(1) + P_{y32}(1)$$

where + represents logical OR. This reduces to:

$$\phi_{31} = P_{x31} + P_{y32}.$$

Since if $S_{31}=0$ $$P_{x31} \veebar P_{y32} = 1,$$

and since the EXCLUSIVE-OR is one if one or the other of $P_{x31}$, or $P_{y32}$ is one, but not both, then:

$$P_{x31} + P_{y32} = 1$$

so that, $$\phi_{31} = 1.$$

Consequently, the carry from bit 31 into bit 30 is guaranteed to be a one if the sum of the addition at bit 31, $S_{31}$, is equal to zero.

Step of induction

Assume that $S_i=0$ and $\phi_{i+1}=1$. Since the sum at i, $S_i$, is $$S_i = P_{xi} \veebar P_{yi+1} \veebar \phi_{i+1},$$

then $$P_{xi} \veebar P_{yi+1} \veebar 1 = 0,$$

or, $$\overline{P_{xi} \veebar P_{yi+1}} = 0$$

$$P_{xi} \veebar P_{yi+1} = 1.$$

The carry at i is:

ti $\phi_i = P_{xi}P_{yi+1} + P_{x1}P_{yi+1}\phi_{i+1}.$

Since $\phi_{i+1}=1$, then $$\phi_i = P_{xi}P_{yi+1} + P_{xi}$$
$$= P_{xi} + P_{yi+1}.$$

But from above, $$P_{xi} \veebar P_{yi+1} = 1,$$

from which it follows that $$P_{xi} + P_{yi+1} = 1,$$

and, $$\phi_i = 1.$$

From steps one and two above, it follows by mathematical induction that $\phi_i=1$ for $0 \leq i \leq 31$.

QED

Theorem 2:

The sum, S, is zero if $P_{xi} \veebar P_{yi+1} = 1$ for $0 \leq i \leq 31$.

Proof:

Proof of if

If $S=0$ then from Theorem 1, $\phi_{i+1}=1$ for any i from which it follows that:

$$P_{xi} \veebar P_{yi+1} = 1.$$

since $S_i$ is zero.

Proof of only if

Consider the carry generated at $\phi_i$. This carry is:

$$\phi_i = P_{xi}P_{yi+1} + P_{xi}\phi_{i+1} + P_{yi+1}\phi_{i+1}$$
$$= P_{xi}P_{yi+1} + P_{xi}\phi_{i+1}(P_{yi+1} + \overline{P_{yi+1}}) + P_{yi+1}\phi_{i+1}(P_{xi} + \overline{P_{xi}})$$
$$= P_{xi}P_{yi+1} + P_{xi}\overline{P_{yi+1}}\phi_{i+1} + P_{yi+1}\overline{P_{xi}}\phi_{i+1}$$
$$= P_{xi}P_{yi+1} + (P_{xi} \veebar P_{yi+1})\phi_{i+1}$$

Since by assumption, $$P_{xi} \veebar P_{yi+1} = 1,$$

then $$\phi_i = \phi_{i+1}$$

Since this must hold for all i and since the carry in is 1, then $$\phi_i = \phi_{i+1} = \ldots = 1$$

Let $S_i=1$. But $S_i$ is:

$$S_i = P_{xi} \veebar P_{yi+1} \veebar \phi_{i+1}.$$

However, $$P_{xi} \forall P_{yi+1} = 1$$

from which it follows that:

$$\phi_{i+1} = 0.$$

Therefore, the assumption that $S_i = 1$ leads to a contradiction and is therefore erroneous. Thus, $S_i$ must be zero.

QED

The conditions for the result of a three-to-one add type operation to be zero follow from Theorem 1 and Theorem 2. These conditions are:

$$P_{x31} \forall \tau_1 = 1$$

and $$P_{xi} \forall P_{yi+1} = 1$$

for all $0 \leq i \leq 30$. Result equal zero, denoted as $R_{=0}$, can therefore be determined from:

$$R_{=0} = (P_{x0} \forall P_{y1})(P_{x1} \forall P_{y2}) \ldots (P_{x30} \forall P_{y31})(P_{x31} \forall \tau_1).$$

These results need to be extended to allow $R_{=0}$ to be produced for interlocked instruction sequences in which a logical instruction is compounded with an arithmetic instruction. This case produces the second category shown earlier. Three implementations have been proposed for producing the desired results from the ALU provided by the Phillips application, supra. The application the above mechanism for generating result equal zero to the second function category is impacted by the choice of implementation. In particular, the generation of result equal zero depends on what outputs are generated by the CSA and by the logic function block in the ALU. Since two of the three implementations found in the Phillips application, supra. produce identical CSA and logic function block outputs while the third produces a unique set of outputs, the implementations can be divided into two implementation schemes for discussing the generation of $R_{=0}$ as was done for the discussion of overflow. The application of the mechanism for generating result equal zero to these two schemes is discussed in the following. Along with the discussion, a stage by stage description of the mechanism is presented.

In the first implementation scheme, an unmodified three-to-two CSA is used to generate a sum, $\sigma$, and a carry, $\lambda$. The inputs to the CSA, however, are controlled so that when executing the second functional category, the sum is equal to the second operand and the carry is zero. In parallel, the logic function block generates the desired logical operation. The first input to the two-to-one adder at bit position i is the CSA sum, $\sigma$, while the second input at the same position is derived by ORing the carry from the CSA at bit position $i+1$, $\lambda_{i+1}$, with the output from the logic function block at bit position i, $L_i$, for all i between 0 and 30. At bit position 31, the first input is $\sigma_{31}$ while the second is $\tau_2$ ORed with $L_{31}$ where $\tau_2$ is one of the hot one's supplied to the ALU. These results imply that the result equal zero scheme derived above can be modified to include the second functional category for the ALU implementation being considered by replacing $\lambda_{i+1}$ with $\lambda_{i+1} + L_i$ for all $0 \leq i \leq 30$ where + indicates the OR function, when generating $P_{xi}$ and $P_{yi}$.

With these modifications, the stage by stage implementation of result equal zero is as follows. In the first stage, the CSA sum, $\sigma$, the CSA carry, $\lambda$, and the output of the logic function block are generated. In the expressions that follow, the inputs to the CSA are denoted by the lower case greek letters corresponding to the appropriate ALU input. This is done to distinguish the controlled CSA input, which may be forced to 0, from the corresponding ALU input. For a three-to-one addition, the ALU input would be passed to the CSA, for example, $\alpha_i$ would be equal to $A_i$. For the addition of the result from a logical operation with a third ALU input, however, $\alpha_i$ and $\gamma_i$ are forced to zero. With this notation, the results from the first stage are:

$$\sigma_i = \alpha_i \forall \beta_i \forall \gamma_i$$

$$\lambda_i = \alpha_i \beta_i + \alpha_i \gamma_i + \beta_i \gamma_i$$

$$L_i = \overline{A_i} \Omega_{OALASL} + \Gamma_i \Omega_{OALASL} + A_i \Gamma_i \Omega_{XAAL} + \overline{A_i} \overline{\Gamma_i} \Omega_{XOSL}$$

in which $\Omega_{OALASL}$, $\Omega_{XAAL}$, and $\Omega_{XOSL}$ represent control signals supplied to the ALU. The details of this implementation can be found in U.S. Pat. No. 5,299,319 Phillips, supra. which has been incorporated hereby by reference. In the next stage, $P_x$ and $P_y$ are generated as the three-to-two addition of the CSA sum with the CSA carry or $\tau_2$ ORed with the logic block output as discussed above, and with minus one. The results are:

$$P_{xi} = \sigma_i \forall (\lambda_{i+1} + L_i) \forall 1$$

$$0 \leq i \leq 30$$

$$P_{x31} = \sigma_{31} \forall (\tau_2 + L_{31}) \forall 1$$

$$P_{yi} = \sigma_i(\lambda_{i+1} + L_i) + \sigma_i(1) + (\lambda_{i+1} + L_i)(1)$$

$$0 \leq i \leq 30$$

$$P_{y31} = \sigma_{31}(\tau_2 + L_{31}) + \sigma_{31}(1) + (\tau_2 + L_{31})(1).$$

These expressions can be simplified by recognizing that:

$$X \forall 1 = \overline{X}$$

$$X(1) = X$$

$$XY + X + Y = X + Y$$

to give:

$$P_{xi} = \overline{\sigma_i \forall (\lambda_{i+1} + L_i)}$$

$$0 \leq i \leq 30$$

$$P_{x31} = \overline{\sigma_{31} \forall (\tau_2 + L_{31})}$$

$$P_{yi} = \sigma_i + \lambda_{i+1} + L_i$$

-continued $$0 \leq i \leq 30$$

$$P_{y31} = \sigma_{31} + \tau_2 + L_{31}.$$

The expressions for $P_{xi}$ and $P_{x31}$ are not implementable in one stage with the assumed bookset. They, however, can be written as:

$$P_{xi} = \overline{\sigma_i}(\lambda_{i+1} + L_i) + \sigma_i(\overline{\lambda_{i+1} + L_i})$$

$$0 \leq i \leq 30$$

$$P_{xi} = \overline{\sigma_i}\lambda_{i+1} + \overline{\sigma_i}L_i + \sigma_i\overline{\lambda_{i+1}L_i}$$

$$0 \leq i \leq 30$$

and, $$P_{x31} = \overline{\sigma_{31}}(\tau_2 + L_{31}) + \sigma_{31}(\overline{\tau_2 + L_{31}})$$

$$P_{x31} = \overline{\sigma_{31}}\tau_2 + \overline{\sigma_{31}}L_{31} + \sigma_{31}\overline{\tau_2 L_{31}}$$

both of which can be implemented in one stage with the assumed bookset.

In the third stage, the two way XOR's can be generated in preparation of generating $R_{=0}$. The desired XOR's are:

$$R_{=0}(i) = P_{xi} \forall P_{yi+1}$$

$$0 \leq i \leq 30$$

$$R_{=0}(31) = P_{x31} \forall \tau_1.$$

In stage four, eight-way ANDs can be applied to these signals to begin producing a single result equal zero signal. The desired expressions are:

$$R_{=0}(0:7) = R_{=0}(0)R_{=0}(1) \ldots R_{=0}(7)$$

$$R_{=0}(8:15) = R_{=0}(8)R_{=0}(9) \ldots R_{=0}(15)$$

$$R_{=0}(16:23) = R_{=0}(16)R_{=0}(17) \ldots R_{=0}(23)$$

$$R_{=0}(24:31) = R_{=0}(24)R_{=0}(25) \ldots R_{=0}(31).$$

Finally, the desired signal, $R_{=0}$, is produced in the fifth stage with a four-way AND by:

$$R_{=0} = R_{=0}(0:7)R_{=0}(8:15)R_{=0}(16:23)R_{=0}(24:31).$$

Figure 6:
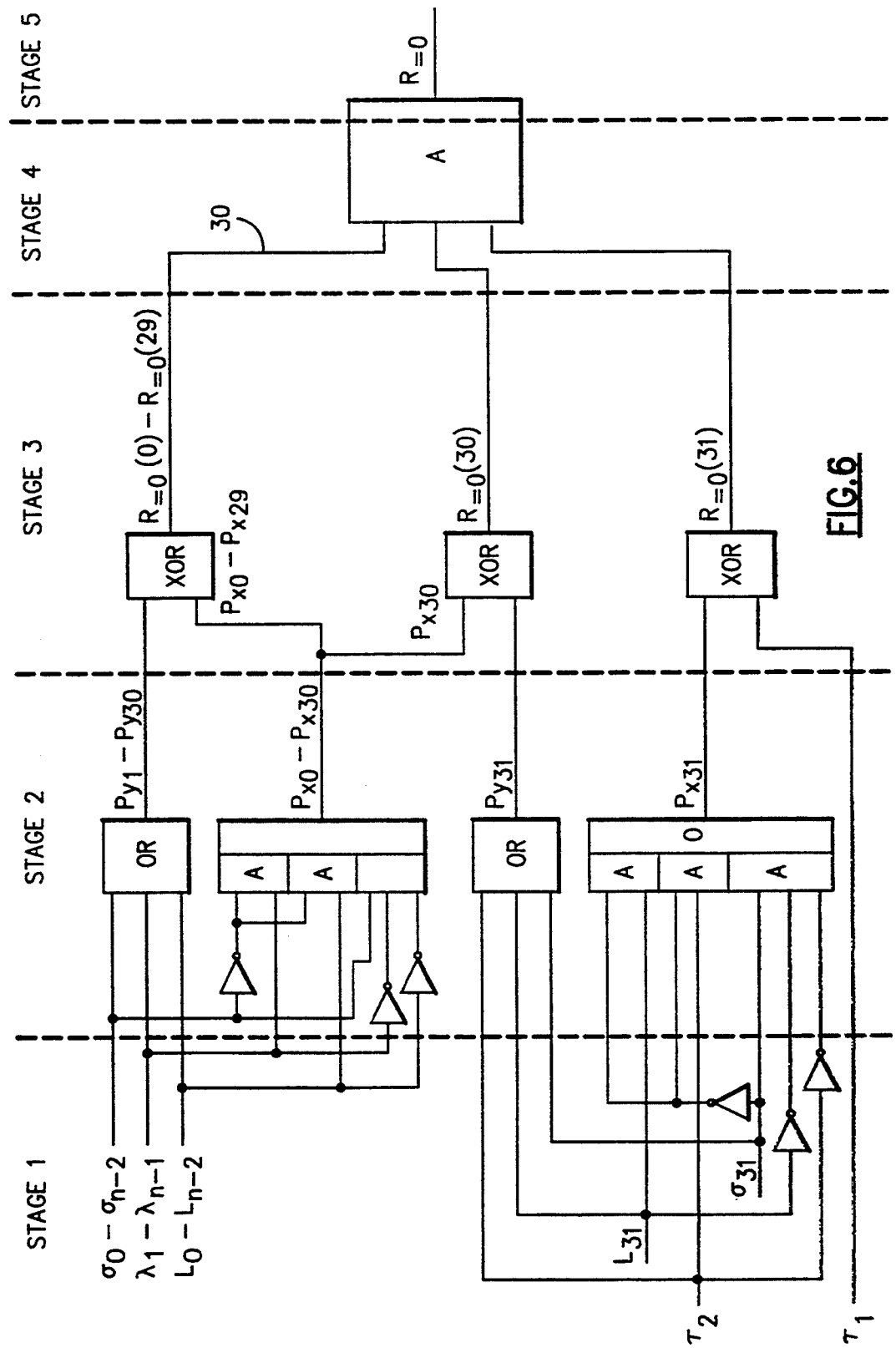
FIG. 6 represents parallel extraction of result equal zero for parallel prediction of status (all embodiments)

The logic diagram for the generation for result equal to zero is shown in FIG. 6.

In the second implementation scheme, the CSA and the logic function block are implemented according to U.S. Pat. No. 5,299,319, Phillips, supra. so that the outputs are:

$$\sigma_i = \alpha_i \forall \beta_i \forall \gamma_i$$

$$0 \leq i \leq 31$$

$$\lambda_0 = \alpha_0\beta_0\Omega_1 + \alpha_0\gamma_0\Omega_2 + \beta_0\gamma_0\Omega_1$$

$$\lambda_i = \alpha_i\beta_i\Omega_1 + \alpha_i\gamma_i\Omega_2 + \beta_i\gamma_i\Omega_1 + \beta_{i-1}\Omega_3$$

$$1 \leq i \leq 31$$

$$\lambda_{32} = \tau_2\overline{\Omega_3} + \beta_{31}\Omega_3$$

$$L_i = A_i\Omega_{OALASL} + \Gamma_i\Omega_{OALASL} + \overline{A_i}\Gamma_i\Omega_{XAAL} + A_i\overline{\Gamma_i}\Omega_{XAAL}$$

$$0 \leq i \leq 31.$$

In these expressions, the notation is as defined above with the addition of $\Omega_1$, $\Omega_2$, and $\Omega_3$ which are controls signals supplied to the ALU. The inputs to the two-to-one CLA, however, are derived differently than in the first implementation scheme. In this case, the first input to the CLA at bit position i is $\lambda_{i+1}$ for $0 \leq i \leq 31$. The second input, however, at bit position i can be expressed by the following Boolean expression:

$$\Omega_4\sigma_i + L_i$$

where $\Omega_4$ is a control signal supplied to the ALU and $0 \leq i \leq 31$. Thus, for these outputs, the result equal zero scheme can be modified to include the second functional category for the ALU implementation by replacing $\sigma_i$ with $\Omega_4\sigma_i + L_i$.

With these modifications, the generation of $R_{=0}$ proceeds as follows. In the first stage, $$\sigma_i = \alpha_i \forall \beta_i \forall \gamma_i$$

$$0 \leq i \leq 31$$

$$\gamma_0 = \alpha_0\beta_0\Omega_1 + \alpha_0\gamma_0\Omega_2 + \beta_0\gamma_0\Omega_1$$

$$\gamma_i = \alpha_i\beta_i\Omega_1 + \alpha_i\gamma_i\Omega_2 + \beta_i\gamma_i\Omega_1 + \beta_{i-1}\Omega_3$$

$$1 \leq i \leq 31$$

$$\gamma_{32} = \tau_2\overline{\Omega_3} + \beta_{31}\Omega_3$$

$$L_i = A_i\Omega_{OALASL} + \Gamma_i\Omega_{OALASL} + \overline{A_i}\Gamma_i\Omega_{XAAL} + A_i\overline{\Gamma_i}\Omega_{XAAL}$$

$$0 \leq i \leq 31$$

can be generated. As before, the details of this implementation can be found in EN9-91-005, Phillips, supra. The generation of $P_x$ and $P_y$ can proceed in the second stage. These signals are generated by:

$$P_{xi} = (\Omega_4\sigma_i + L_i) \forall \lambda_{i+1} \forall 1$$

$$P_{yi} = (\Omega_4\sigma_i + L_i)\lambda_{i+1} + (\Omega_4\sigma_i + L_i)(1) + \lambda_{i+1}(1)$$

for all i such that $0 \leq i \leq 31$. Simplification of these expressions results in:

$$P_{xi} = \overline{(\Omega_4\sigma_i + L_i)} \forall \lambda_{i+1}$$

$$P_{yi} = \Omega_4\sigma_i + L_i + \lambda_{i+1}.$$

The expression for $P_x$ is not implementable in one stage as expressed, but the expression can be rewritten as:

$$P_{xi} = \overline{(\Omega_4\sigma_i + L_i)}\lambda_{i+1} + (\Omega_4\sigma_i + L_i)\overline{\lambda_{i+1}}$$

-continued $$= \overline{\Omega_4 \sigma_i L_i \lambda_{i+1}} + \Omega_4 \sigma_i \overline{\lambda_{i+1}} + L_i \overline{\lambda_{i+1}}$$

$$= \overline{(\Omega_4 + \overline{\sigma_i}) L_i \lambda_{i+1}} + \Omega_4 \sigma_i \overline{\lambda_{i+1}} + L_i \overline{\lambda_{i+1}}$$

$$= \overline{\Omega_4 L_i \lambda_{i+1}} + \overline{\sigma_i L_i \lambda_{i+1}} + \Omega_4 \sigma_i \overline{\lambda_{i+1}} + L_i \overline{\lambda_{i+1}}$$

which is implementable in one stage with the assumed bookset. The remainder of the generation of $R_{=0}$ consisting of the third, fourth, and fifth stages can be achieved with the identical circuitry as used for the first implementation scheme. Thus, $R_{=0}$ can be obtained in the fifth stage which is the same stage that the output of the ALU is generated, see U.S. Pat. No. 5,299,319, Phillips, supra.

Clearly, the inventions we have described by way of exemplary implementation schemes or preferred embodiments and in illustration of our best mode for practicing the inventions provide a basis for potential growth in processor performance. Accordingly, it will be understood that those skilled in the art after reviewing our presently contemplated implementations for practicing our inventions, both now and in the future, will envision further improvements and enhancements which may even amount to inventions, and these should be understood to be within the intended s cope of the following claims which should be construed to maintain the first inventors' rights as they should be accorded.

What is claimed is:

1. An ALU status determination apparatus comprising:
   a three-to-one ALU means for executing plural instructions in parallel, including first and second instructions of a pair of instructions;
   predicting means for predicting the status of three-to-one ALU operations, said status being indicative of (a) the presence or absence of carries generated by said three-to-one ALU means and (b) whether or not said second instruction of the pair of instructions is independent or dependent upon the result of the operation of said first instruction; and
   overflow means for predicting an overflow and the carries required to compute the overflow computed by:

$$c_1 = \kappa_1^* \ \phi_1$$

$$c_0 = \kappa_0^* T_0 + \kappa_0^* G_0 \phi_1 + \kappa_0^* G_0 + \kappa_0^* T_0 \phi_1, \text{ where}$$

$$G_{cc1}^* = \alpha_1 \gamma_1$$

$$G_{cci}^{*i+1} = \alpha_i \gamma_i + \alpha_{i+1} \gamma_{i+1}$$

$$i = 0, 2, 4, 6, \ldots, 28$$

$$T_{cci} = \alpha_i + \gamma_i$$

$$i = 0, 1, 4, 7, 8, 12, 16, 20, 28$$

$$T_{cci}^{i+1} = \alpha_i \gamma_i + \alpha_{i+1} \gamma_{i+1}$$

$$i = 1, 9, 17, 25$$

$$T_{cci}^{i+2} = \alpha_i \gamma_i + \alpha_{i+1} \gamma_{i+1} + \alpha_{i+2} \gamma_{i+2}$$

$$i = 1, 4, 7, 9, 10, 12, 13, 16, 17, 19, 20, 22, 25, 28$$

$$\psi_{30} = \alpha_{30} \gamma_{30} + \alpha_{31} \gamma_{31} + \alpha_3 \tau_2 + \gamma_3 \tau_2$$

-continued $$\lambda_i = \alpha_i \beta_i + \alpha_i \gamma_i + \beta_i \gamma_i$$

$$0 \leq i \leq 31$$

$$\sigma_i = \alpha_i \ \beta_i \ \gamma_i$$

$$0 \leq i \leq 31$$

$$L_i = A_i \Omega_{OALASL} + \Gamma_i \Omega_{AOLASL} + A_i \Gamma_i \Omega_{XAAL} + A_i \Gamma_i \Omega_{XOSL}$$

$$0 \leq i \leq 31$$

$$G_{cc1}^{*7} = G_{cc1}^* + T_{cc1}^2 G_{cc2}^{*3} + T_{cc1}^3 T_{cc4} G_{cc4}^{*5} + T_{cc1}^3 T_{cc4}^6 G_{cc8}^{*7}$$

$$G_{cci}^{*i+7} = G_{cci}^{*i+1} + T_{cci+1}^{i+2} G_{cci+2}^{*i+3} + T_{cci+1}^{i+3} T_{cci+4} G_{cci+4}^{*i+5} +$$

$$T_{cci+1}^{i+3} T_{cci+4}^{i+6} G_{cci+8}^{*i+7}$$

$$i = 0, 8, 16$$

$$T_{cc1}^8 = T_{cc1}^3 T_{cc4}^6 T_{cc7} T_{cc8}$$

$$T_{cc1}^{16} = T_{cc1}^3 T_{cc4}^6 T_{cc7}^9 T_{cc10}^{12} T_{cc13}^{15} T_{cc16}$$

$$T_{cc1}^{24} = T_{cc1}^3 T_{cc4}^6 T_{cc7}^9 T_{cc10}^{12} T_{cc13}^{15} T_{cc16}^{18} T_{cc19}^{21} T_{cc22}^{24}$$

$$\psi_{24}^{30} = G_{cc24}^{*25} + T_{cc25}^{26} G_{cc26}^{*27} + T_{cc25}^{27} T_{cc28} G_{cc28}^{*29} + T_{cc25}^{27} T_{cc28}^{30} \psi_{30}$$

$$G_i^{*i+1} = \lambda_{i+1} \sigma_i + \lambda_{i+2} \sigma_{i+1} + L_i \sigma_i + L_{i+1} \sigma_{i+1}$$

$$i = 1, 3, 5, \ldots, 29$$

$$T_i = \sigma_i + \lambda_{i+1} + L_i$$

$$i = 1, 5, 8, 9, 13, 17, 21, 29$$

$$T_i^{i+1} = \sigma_i \lambda_{i+1} L_i + \sigma_{i+1} \lambda_{i+2} L_{i+1}$$

$$i = 2, 10, 18, 23, 26$$

$$T_i^{i+2} = \sigma_i \lambda_{i+1} L_i + \sigma_{i+1} \lambda_{i+2} L_{i+1} + \sigma_{i+2} \lambda_{i+3} L_{i+2}$$

$$i = 2, 5, 8, 10, 11, 13, 14, 17, 18, 20, 21, 23, 26, 29$$

$$\Phi_{31} = \tau_2 \sigma_{31} + L_{31} \sigma_{31} + \tau_1$$

$$\kappa_0 = T_{cc0} G_{cc0}^{*7} + T_{cc0} T_{cc1}^8 G_{cc8}^{*15} + T_{cc0} T_{cc1}^{18} G_{cc16}^{*23} + T_{cc0} T_{cc1}^{24} \psi_{24}^{30}$$

$$\kappa_1 = T_{cc1} G_{cc1}^{*7} + T_{cc1}^8 G_{cc8}^{*15} + T_{cc1}^{16} G_{cc16}^{*23} + T_{cc1}^{24} \psi_{24}^{30}$$

$$G_i^{*i+7} + G_i^{*i+1} + T_{i+1}^{i+2} G_{i+2}^{*i+3} + T_{i+1}^{i+3} T_{i+4} G_{i+4}^{*i+5} +$$
$$T_{i+1}^{i+3} T_{i+4}^{i+6} G_{i+8}^{*i+7}$$

$$i = 1, 9, 17$$

$$T_2^9 = T_2^4 T_5^7 T_8 T_9$$

$$T_2^{17} = T_2^4 T_5^7 T_8^{10} T_{11}^{13} T_{14}^{16} T_{17}$$

$$T_2^{25} = T_2^4 T_5^7 T_8^{10} T_{11}^{13} T_{14}^{16} T_{17}^{19} T_{20}^{22} T_{23}^{25}$$

$$\Phi_{25}^{30} = G_{25}^{*26} + T_{26}^{27} G_{27}^{*28} + T_{26}^{28} T_{29} G_{29}^{*30} + T_{26}^{28} T_{29}^{31} \Phi_{31}$$

$$\kappa_0^* = \kappa_0 \ \lambda_0$$

$$\kappa_i^* = \kappa_1 \ \lambda_1$$

$$\phi_1 = T_1 G_1^{*8} + T_1 T_2^9 G_9^{*16} + T_1 T_2^{17} G_{17}^{*24} + T_1 T_2^{25} \Phi_{25}^{31}.$$

2. The apparatus according to claim 1 wherein an overflow means is provided for predicting an overflow for arithmetic followed by arithmetic operations in the said three-to-one ALU means.

3. The apparatus according to claim 2 wherein the arithmetic operations are additions and subtractions in two's complement or unsigned form.

4. The apparatus according to claim 1 wherein overflow means is provided for predicting the overflow for logical followed by arithmetic operations in said three-to-one ALU means.

5. The apparatus according to claim 4 wherein the arithmetic operations are additions and substractions in two's complement or unsigned form and the logical operations include AND, OR, or XOR.

6. The apparatus according to claim 1 wherein carries are computed in five stages by computing:

STAGE 1

$G^*_{cc1} = \alpha_1 \gamma_1$ $G^{*i+1}_{cci} = \alpha_i \gamma_i + \alpha_{i+1} \gamma_{i+1}$ $i = 0, 2, 4, 6, \ldots, 28$ $T_{cci} = \alpha_i + \gamma_i$ $i = 0, 1, 4, 7, 8, 12, 16, 20, 28$ $T^{i+1}_{cci} = \overline{\overline{\alpha_i \gamma_i} + \overline{\alpha_{i+1} \gamma_{i+1}}}$ $i = 1, 9, 17, 25$ $T^{i+2}_{cci} = \overline{\overline{\alpha_i \gamma_i} + \overline{\alpha_{i+1} \gamma_{i+1}} + \overline{\alpha_{i+2} \gamma_{i+2}}}$ $i = 1, 4, 7, 9, 10, 12, 13, 16, 17, 19, 20, 22, 25, 28$ $\psi_{30} = \alpha_{30}\gamma_{30} + \alpha_{31}\gamma_{31} + \alpha_{31}\tau_2 + \gamma_{31}\tau_2$ $\lambda_i = \alpha_i \beta_i + \alpha_i \gamma_i + \beta_i \gamma_i$ $0 \leq i \leq 31$ $\sigma_i = \alpha_i \forall \beta_i \forall \gamma_i$ $0 \leq i \leq 31$ $L_i = A_i \Omega_{OALASL} + \Gamma_i \Omega_{AOLASL} + A_i \Gamma_i \Omega_{XAAL} + \overline{A_i \Gamma_i} \Omega_{XOSL}$ $0 \leq i \leq 31$

STAGE 2

$G^{*7}_{cc1} = G^*_{cc1} + T^2_{cc1} G^{*3}_{cc2} + T^3_{cc1} T_{cc4} G^{*5}_{cc4} + T^3_{cc1} T^6_{cc4} G^{*7}_{cc8}$ $G^{*i+7}_{cci} = G^{*i+1}_{cci} + T^{i+2}_{cci+1} G^{*i+3}_{cci+2} + T^{i+3}_{cci+1} T_{cci+4} G^{*i+5}_{cci+4} +$
$\qquad T^{i+3}_{cci+1} T^{i+6}_{cci+4} G^{*i+7}_{cci+8}$ $i = 0, 8, 16$ $T^8_{cc1} = T^3_{cc1} T^6_{cc4} T_{cc7} T_{cc8}$ $T^{16}_{cc1} = T^3_{cc1} T^6_{cc4} T^9_{cc7} T^{12}_{cc10} T^{15}_{cc13} T_{cc16}$ $T^{24}_{cc1} = T^3_{cc1} T^6_{cc4} T^9_{cc7} T^{12}_{cc10} T^{15}_{cc13} T^{18}_{cc16} T^{21}_{cc19} T^{24}_{cc22}$ $\psi^{30}_{24} = G^{*25}_{cc24} + T^{26}_{cc25} G^{*27}_{cc26} + T^{27}_{cc25} T_{cc28} G^{*29}_{cc28} + T^{27}_{cc25} T^{30}_{cc28} \psi_{30}$ $G^{*i+1}_i = \lambda_{i+1} \sigma_i + \lambda_{i+2} \sigma_{i+1} + L_i \sigma_i + L_{i+1} \sigma_{i+1}$ $i = 1, 3, 5, \ldots, 29$ $T_i = \sigma_i + \lambda_{i+1} + L_i$ $i = 1, 5, 8, 9, 13, 17, 21, 29$ $T^{i+1}_i = \overline{\overline{\sigma_i \lambda_{i+1} L_i} + \overline{\sigma_{i+1} \lambda_{i+2} L_{i+1}}}$ $i = 2, 10, 18, 23, 26$ $T^{i+2}_i = \overline{\overline{\sigma_i \lambda_{i+1} L_i} + \overline{\sigma_{i+1} \lambda_{i+2} L_{i+1}} + \overline{\sigma_{i+2} \lambda_{i+3} L_{i+2}}}$ $i = 2, 5, 8, 10, 11, 13, 14, 17, 18, 20, 21, 23, 26, 29$ $\Phi_{31} = \tau_2 \sigma_{31} + L_{31} \sigma_{31} + \tau_1$

STAGE 3

$\kappa_0 = T_{cc0} G^{*7}_{cc0} + T_{cc0} T^8_{cc1} G^{*15}_{cc8} + T_{cc0} T^{18}_{cc1} G^{*23}_{cc16} + T_{cc0} T^{24}_{cc1} \psi^{30}_{24}$ $\kappa_1 = T_{cc1} G^{*7}_{cc1} + T^8_{cc1} G^{*15}_{cc8} + T^{16}_{cc1} G^{*23}_{cc16} + T^{24}_{cc1} \psi^{30}_{24}$ $G^{*i+7}_i + G^{*i+1}_i + T^{i+2}_{i+1} G^{*i+3}_{i+2} + T^{i+3}_{i+1} T_{i+4} G^{*i+5}_{i+4} +$
$T^{i+3}_{i+1} T^{i+6}_{i+4} G^{*i+7}_{i+8}$ $i = 1, 9, 17$ $T^9_2 = T^4_2 T^7_5 T_8 T_9$ $T^{17}_2 = T^4_2 T^7_5 T^{10}_8 T^{13}_{11} T^{16}_{14} T_{17}$ $T^{25}_2 = T^4_2 T^7_5 T^{10}_8 T^{13}_{11} T^{16}_{14} T^{19}_{17} T^{22}_{20} T^{25}_{23}$ $\Phi^{30}_{25} = G^{*26}_{25} + T^{27}_{26} G^{*28}_{27} + T^{28}_{26} T_{29} G^{*30}_{29} + T^{28}_{26} T^{31}_{29} \Phi_{31}$

STAGE 4

$\kappa_0^* = \kappa_0 \forall \lambda_0$ $\kappa_1^* = \kappa_1 \forall \lambda_1$ $\phi_1 = T_1 G_1{*8} + T_1 T^9_2 G_9{*16} T_1 T^{17}_2 G_{17}{*24} + T_1 T^{25}_2 \Phi^{31}_{25}$

STAGE 5

$C_1 = \kappa_1^* \forall \phi_1$ $C_0 = \kappa_0^* \overline{T_0} + \kappa_0^* \overline{G_0 \phi_1} + \overline{\kappa_0^*} G_0 + \overline{\kappa_0^*} T_0 \phi_1$.

7. The apparatus according to claim 1 wherein overflow is computed from the carries of claim 6 as:

$OF = X_6 \forall X_4 \phi_1 = \overline{X_6} X_4 \phi_1 + X_6 \overline{X_4} + X_6 \overline{\phi_1}$.

where $X_1 = \overline{\alpha_0 \forall \gamma_0}$ $X_2 = \beta_0 (\alpha_0 \forall \gamma_0) = \beta_0 \alpha_0 \overline{\gamma_0} + \beta_0 \overline{\alpha_0} \gamma_0$ $X_3 = \overline{\sigma_0} \lambda_1 + \sigma_0 L_0$ $X_4 = \overline{\sigma_0 L_0} \lambda_1 + \sigma_0 \lambda_1 + \sigma_0 L_0$ $X_5 = X_2 \forall X_3$ $\kappa_1 = T_{cc1} G_{cc1}^{*7} + T^8_{cc1} G_{CC8}^{*15} + T^{16}_{cc1} G_{cc16}^{*23} +$
$\quad T^{24}_{cc1} \psi^{30}_{24}$ $X_6 = X_5 \forall X_1 \kappa_1 = X_5 \overline{X_1} + X_5 \overline{\kappa_1} + \overline{X_5} X_1 \kappa_1$ $\phi_1 = T_1 G_1^{*8} + T_1 T^9_2 G_9^{*16} + T_1 T^{17}_2 G_{17}^{*24}$
$\quad + T_1 T^{25}_2 \Phi^{31}_{25}$.

8. The apparatus according to claim 1 wherein the overflow is computed in five stages by:

STAGE 1

$X_1 = \overline{\alpha_0 \forall \gamma_0}$ $X_2 = \beta_0 (\alpha_0 \forall \gamma_0) = \beta_0 \alpha_0 \overline{\gamma_0} + \beta_0 \overline{\alpha_0} \gamma_0$

STAGE 2

$X_3 = \overline{\sigma_0} \lambda_1 + \sigma_0 L_0$ $X_4 = \overline{\sigma_0 L_0} \lambda_1 + \sigma_0 \lambda_1 + \sigma_0 L_0$

STAGE 3

$X_5 = X_2 \lor X_3$ $\kappa_1 = T_{cc1}G_{cc1}^{*7} + T_{cc1}^8 G_{cc8}^{*15} + T_{cc1}^{16}G_{cc16}^{*23} + T_{cc1}^{24}\psi_{24}^{30}$

STAGE 4

$X_6 = X_5 \lor X_1\kappa_1 = X_5\overline{X_1} + X_5\overline{\kappa_1} + \overline{X_5}X_1\kappa_1$ $\phi_1 = T_1 G_1^{*8} + T_1 T_2^9 G_9^{*16} + T_1 T_2^{17} G_{17}^{*24} + T_1 T_2^{25}\Phi_{25}^{31}$

STAGE 5

$OF = X_6 \lor X_4\phi_1 = \overline{X_6}X_4\phi_1 + X_6\overline{X_4} + X_6\overline{\phi_1}.$ 9. An ALU status determination apparatus according to claim 1 wherein said predicting means include zero means for predicting a result equal zero in said three-to-one ALU means.

10. The apparatus according to claim 9 wherein said zero means predicts the result equal zero for arithmetic followed by arithmetic operations in said three-to-one ALU means.

11. The apparatus according to claim 10 wherein the the arithmetic operations are additions and subtractions in two's complement or unsigned form.

12. The apparatus according to claim 9 wherein said zero means predicts the result equal zero for logical followed by arithmetic operations in said three-to-one ALU means.

13. The apparatus according to claim 12 wherein the arithmetic operations are additions and subtractions in two's complement or unsigned form and logical operations are binary AND, OR, or XOR.

14. An ALU status determination apparatus comprising:
   a three-to-one ALU means for executing plural instructions in parallel, including first and second instructions of a pair of instructions;
   predicting means for predicting the status of three-to-one ALU operations, said status being indicative of (a) the presence or absence of carries generated by said three-to-one ALU means and (b) whether or not said second instruction of the pair of instructions is independent or dependent upon the result of the operation of said first instruction; and
   overflow means and the carries required to compute the overflow computed by:

$G_{cc1}^* = \alpha_1\gamma_1$ $G_{cci}^{*i+1} = \alpha_i\gamma_i + \alpha_{i+1}\gamma_{i+1}$ $i = 0, 2, 4, 6, \ldots 28$ $T_{cci} = \alpha_i + \gamma_i$ $i = 1, 4, 7, 8, 12, 16, 20, 28$ $T_{cc0}^* = \Omega_{3ot1}\alpha_0 + \Omega_{3tol}\gamma_0$ $T_{cci}^{i+1} = \alpha_i\gamma_i + \alpha_{i+1}\gamma_{i+1}$ $i = 1, 7, 9, 17, 25$ -continued $T_{cci}^{i+2} = \alpha_i\gamma_i + \alpha_{i+1}\gamma_{i+1} + \alpha_{i+2}\gamma_{i+2}$ $i = 1, 4, 7, 9, 10, 12, 13, 16, 17, 19, 20, 22, 25, 28$ $\psi_{30} = \alpha_{30}\gamma_{30} + \alpha_{31}\gamma_{31} + \alpha_{31}\tau_2 + \gamma_{31}\tau_2$ $\lambda_0 = \Omega_1\alpha_0\beta_0 + \Omega_2\alpha_0\gamma_0 + \Omega_1\beta_0\gamma_0$ $\lambda_i = \Omega_1\alpha_i\beta_i + \Omega_2\alpha_i\gamma_i + \Omega_1\beta_i\gamma_i + \Omega_3\beta_{i-1}$ $1 \leq i \leq 31$ $\lambda_{32} = \Omega_3\beta_{31} + \Omega_3\tau_2.$ $\lambda_{cc0} = \Omega_{3tol}\alpha_0\beta_0 + \Omega_{3tol}\alpha_0\gamma_0 + \Omega_{3tol}\beta_0\gamma_0$ $\lambda_{cc1} = \Omega_{3tol}\alpha_1\beta_1 + \Omega_{3tol}\alpha_1\gamma_1 + \Omega_{3tol}\beta_1\gamma_1.$ $\sigma_i = \alpha_i \beta_i \gamma_i$ $0 \leq i \leq 31$ $L_i = A_i\Omega_{OALASL} + \Gamma_i\Omega_{AOLASL} + A_i\Gamma_i\Omega_{XAAL} + A_i\Gamma_i\Omega_{XOSL}$ $0 \leq i \leq 31$ $G_{cc1}^{*7} = G_{cc1}^* + T_{cc1}^2 G_{cc2}^{*3} + T_{cc1}^3 T_{cc4}G_{cc4}^{*5} + T_{cc1}^3 T_{cc4}^6 G_{cc8}^{*7}$ $G_{cci}^{*i+7} = G_{cci}^{*i+1} + T_{cci+1}^{i+2} G_{cci+2}^{*i+3} + T_{cci+1}^{i+3}T_{cci+4}G_{cci+4}^{*i+5} + T_{cci+1}^{i+3}T_{cci+4}^{i+6}G_{cci+8}^{*i+7}$ $i = 0, 8, 16$ $T_{cc1}^8 = T_{cc1}^3 T_{cc4}^6 T_{cc7}T_{cc8}$ $T_{cc1}^{16} = T_{cc1}^3 T_{cc4}^6 T_{cc7}^9 T_{cc10}^{12} T_{cc13}^{15} T_{cc16}$ $T_{cc1}^{24} = T_{cc1}^3 T_{cc4}^6 T_{cc7}^9 T_{cc10}^{12} T_{cc13}^{15} T_{cc16}^{18} T_{cc19}^{21} T_{cc22}^{24}$ $\psi_{24}^{30} = G_{cc24}^{*25} + T_{cc25}^{26}G_{cc26}^{*27} + T_{cc25}^{27}T_{cc28}G_{cc28}^{*29} + T_{cc25}^{27}T_{cc28}^{30}\psi_{30}$ $G_i^{*i+1} = \Omega_4\sigma_i\lambda_{i+1} + \Omega_4\sigma_{i+1}\lambda_{i+2} + L_i\lambda_{i+1} + L_{i+1}\lambda_{i+2}$ $i = 1, 3, 5, \ldots, 29$ $G_0^* = \Omega_4\sigma_0\lambda_1 + L_0\lambda_1$ $T_i = \lambda_{i+1} + \Omega_4\sigma_i + L_i$ $i = 0, 1$ $T_i^{i+1} = \lambda_{i+1}\Omega_4 L_i + \lambda_{i+1}\sigma_i L_i + \lambda_{i+2}\Omega_4 L_{i+1} + \lambda_{i+2}\sigma_{i+1}L_{i+1}$ $i = 0, 2, 4, \ldots, 30$ $\Phi_{31} = \Omega_4\sigma_{31}\lambda_{32} + L_{31}\lambda_{32} + \tau_1$ $\kappa_0 = T_{cc0}^* G_{cc0}^{*7} + T_{cc0}^* T_{cc1}^8 G_{cc8}^{*15} + T_{cc0}^* T_{cc1}^{16} G_{cc16}^{*23} + T_{cc0}^* T_{cc1}^{24}\psi_{24}^{30}$ $\kappa_1 = \Omega_{3tol}T_{cc1}G_{cc1}^{*7} + \Omega_{3tol}T_{cc1}^8 G_{cc8}^{*15} + \Omega_{3tol}T_{cc1}^{16}G_{cc16}^{*23} + \Omega_{3tol}T_{cc1}^{24}\psi_{24}^{30}$ $G_i^{*i+5} = G_i^{*i+1} + T_{i+1}^{i+2}G_{i+2}^{*i+3} + T_{i+1}^{i+2}T_{i+3}^{i+4}G_{i+4}^{*i+5}$ $i = 9, 15, 21$ $T_1^9 = T_1 T_2^3 T_4^5 T_6^7 T_8^9$ $T_2^9 = T_2^3 T_4^5 T_6^7 T_8^9$ $T_{12}^{15} = T_{12}^{13}T_{14}^{15}$ $T_{12}^{21} = T_{12}^{13}T_{14}^{15}T_{16}^{17}T_{18}^{19}T_{20}^{21}$ $T_{12}^{27} = T_{12}^{13}T_{14}^{15}T_{16}^{17}T_{18}^{19}T_{20}^{21}T_{22}^{23}T_{24}^{25}T_{26}^{27}$ $U_1 = G_0^* G_1^{*2}$ $\Phi_{27}^{30} = G_{27}^{*28} + T_{28}^{29}G_{29}^{*30} + T_{28}^{29}T_{30}^{31}\Phi_{31}$ $\kappa_0^* = \kappa_0 \ \lambda_{cc0}$ -continued $\kappa_1^* = \kappa_1 \ \lambda_{cc1}$ $G_i^{*8} = G_i^{*2} + T_2^3 G_3^{*9}$ $G_1^{*8} = G_1^{*2} T_2^3 + G_1^{*2} G_3^{*8}$ $U_2 = T_1 + T_2^3 G_1^{*2} + T_2^9 G_1^{*2} G_3^{*8}$ $U_3 = G_0^* + T_0^1 G_1^{*2} + T_0^1 T_2^3 G_3^{*8}$ $U_4 = T_0 + G_0^* T_1 + T_2^3 U_1 + T_2^9 U_1 G_3^{*8}$ $\Phi_9^{26} = G_9^{*14} + T_{10}^{11} T_{12}^{15} G_{15}^{*20} + T_{10}^{11} T_{12}^{21} G_{21}^{*26} + T_{10}^{11} T_{12}^{27} \Phi_{27}^{31}$.

15. The apparatus according to claim 14 wherein the carries computed for overflow in claim 14 are computed in five stages by computing:

STAGE 1

$G_{cc1}^* = \alpha_1 \gamma_1$ $G_{cci}^{*i+1} = \alpha_i \gamma_i + \alpha_{i+1} \gamma_{i+1}$ $i = 0, 2, 4, 6, \ldots 28$ $T_{cci} = \alpha_i + \gamma_i$ $i = 1, 4, 7, 8, 12, 16, 20, 28$ $T_{cc0}^* = \Omega_{3to1} \alpha_0 + \Omega_{3to1} \gamma_0$ $T_{cci}^{i+1} = \overline{\overline{\alpha_i \gamma_i} + \overline{\alpha_{i+1} \gamma_{i+1}}}$ $i = 1, 7, 9, 17, 25$ $T_{cci}^{i+2} = \overline{\overline{\alpha_i \gamma_i} + \overline{\alpha_{i+1} \gamma_{i+1}} + \overline{\alpha_{i+2} \gamma_{i+2}}}$ $i = 1, 4, 7, 9, 10, 12, 13, 16, 17, 19, 20, 22, 25, 28$ $\psi_{30} = \alpha_{30} \gamma_{30} + \alpha_{31} \gamma_{31} + \alpha_{31} \tau_2 + \gamma_{31} \tau_2$ $\lambda_0 = \Omega_1 \alpha_0 \beta_0 + \Omega_2 \alpha_0 \gamma_0 + \Omega_1 \beta_0 \gamma_0$ $\lambda_i = \Omega_1 \alpha_i \beta_i + \Omega_2 \alpha_i \gamma_i + \Omega_1 \beta_i \gamma_i + \Omega_3 \beta_{i-1}$ $1 \leq i \leq 31$ $\lambda_{32} = \Omega_3 \beta_{31} + \overline{\Omega_3} \tau_2$.

$\lambda_{cc0} = \Omega_{3to1} \alpha_0 \beta_0 + \Omega_{3to1} \alpha_0 \gamma_0 + \Omega_{3to1} \beta_0 \gamma_0$ $\lambda_{cc1} = \Omega_{3to1} \alpha_1 \beta_1 + \Omega_{3to1} \alpha_1 \gamma_1 + \Omega_{3to1} \beta_1 \gamma_1$.

$\sigma_i = \alpha_i \forall \beta_i \forall \gamma_i$ $0 \leq i \leq 31$ $L_i = A_i \Omega_{OALASL} + \overline{\Gamma_i} \Omega_{AOLASL} + \overline{A_i} \Gamma_i \Omega_{XAAL} + A_i \overline{\Gamma_i} \Omega_{XOSL}$ $0 \leq i \leq 31$

STAGE 2

$G_{cc1}^{*7} = G_{cc1}^* + T_{cc1}^2 G_{cc2}^{*3} + T_{cc1}^3 T_{cc4} G_{cc4}^{*5} + T_{cc1}^3 T_{cc4}^6 G_{cc8}^{*7}$ $G_{cci}^{*i+7} = G_{cci}^{*i+1} + T_{cci+1}^{i+2} G_{cci+2}^{*i+3} + T_{cci+1}^{i+3} T_{cci+4} G_{cci+4}^{*i+5} + T_{cci+1}^{i+3} T_{cci+4}^{i+6} G_{cci+8}^{*i+7}$ $i = 0, 8, 16$ $T_{cc1}^8 = T_{cc1}^3 T_{cc4}^6 T_{cc7} T_{cc8}$ $T_{cc1}^{16} = T_{cc1}^3 T_{cc4}^6 T_{cc7}^9 T_{cc10}^{12} T_{cc13}^{15} T_{cc16}$ $T_{cc1}^{24} = T_{cc1}^3 T_{cc4}^6 T_{cc7}^9 T_{cc10}^{12} T_{cc13}^{15} T_{cc16}^{18} T_{cc19}^{21} T_{cc22}$ $\psi_{24}^{30} = G_{cc24}^{*25} + T_{cc25}^{26} G_{cc26}^{*27} + T_{cc25}^{27} T_{cc28} G_{cc28}^{*29} + T_{cc25}^{27} T_{cc28}^{30} \psi_{30}$ -continued $G_i^{*i+1} = \Omega_4 \sigma_i \lambda_{i+1} + \Omega_4 \sigma_{i+1} \lambda_{i+2} + L_i \lambda_{i+1} + L_{i+1} \lambda_{i+2}$ $i = 1, 3, 5, \ldots, 29$ $G_0^* = \Omega_4 \sigma_0 \lambda_1 + L_0 \lambda_1$ $T_i = \lambda_{i+1} + \Omega_4 \sigma_i + L_i$ $i = 0, 1$ $T_1^{i+1} = \overline{\lambda_{i+1} \Omega_4 L_i} + \overline{\lambda_{i+1} \sigma_i L_i} + \overline{\lambda_{i+2} \Omega_4 L_{i+1}} + \overline{\lambda_{i+2} \sigma_{i+1} L_{i+1}}$ $i = 0, 2, 4, \ldots, 30$ $\Phi_{31} = \Omega_4 \sigma_{31} \lambda_{32} + L_{31} \lambda_{32} + \tau_1$

STAGE 3

$\kappa_0 = T_{cc0}^* G_{cc0}^{*7} + T_{cc0}^* T_{cc1}^8 G_{cc8}^{*15} + T_{cc0}^* T_{cc1}^{16} G_{cc16}^{*23} + T_{cc0}^* T_{cc1}^{24} \psi_{24}^{30}$ $\kappa_1 = \Omega_{3to1} T_{cc1} G_{cc1}^{*7} + \Omega_{3to1} T_{cc1}^8 G_{cc8}^{*15} +$ $\Omega_{3to1} T_{cc1}^{16} G_{cc16}^{*23} + \Omega_{3to1} T_{cc1}^{24} \psi_{24}^{30}$ $G_1^{*i+5} = G_i^{*i+1} + T_{i+1}^{i+2} G_{i+2}^{*i+3} + T_{i+1}^{i+2} T_{i+3}^{i+4} G_{i+4}^{*i+5}$ $i = 9, 15, 21$ $T_1^9 = T_1 T_2^3 T_4^5 T_6^7 T_8^9$ $T_2^9 = T_2^3 T_4^5 T_6^7 T_8^9$ $T_{12}^{15} = T_{12}^{13} T_{14}^{15}$ $T_{12}^{21} = T_{12}^{13} T_{14}^{15} T_{16}^{17} T_{18}^{19} T_{20}^{21}$ $T_{12}^{27} = T_{12}^{13} T_{14}^{15} T_{16}^{17} T_{18}^{19} T_{20}^{21} T_{22}^{23} T_{24}^{25} T_{26}^{27}$ $U_1 = \overline{G_0^* G_1^{*2}}$ $\Phi_{27}^{30} = G_{27}^{*28} + T_{28}^{29} G_{29}^{*30} + T_{28}^{29} T_{30}^{31} \Phi_{31}$

STAGE 4

$\kappa_0^* = \kappa_0 \forall \lambda_{cc0}$ $\kappa_1^* = \kappa_1 \forall \lambda_{cc1}$ $G_1^{*8} = G_1^{*2} + T_2^3 G_3^{*8}$ $\overline{G_1^{*8}} = \overline{G_1^{*2} T_2^3} + \overline{G_1^{*2} G_3^{*8}}$ $U_2 = \overline{T_1} + \overline{T_2^3 G_1^{*2}} + \overline{T_2^9 G_1^{*2} G_3^{*8}}$ $U_3 = G_0^* + T_0^1 G_1^{*2} + T_0^1 T_2^3 G_3^{*8}$ $U_4 = \overline{T_0} + \overline{G_0^* T_1} + \overline{T_2^3 U_1} + \overline{T_2^9 U_1 G_3^{*8}}$ $\Phi_9^{26} = G_9^{*14} + T_{10}^{11} T_{12}^{15} G_{15}^{*20} + T_{10}^{11} T_{12}^{21} G_{21}^{*26} + T_{10}^{11} T_{12}^{27} \Phi_{27}^{31}$

STAGE 5

$c_1 = \kappa_1^* U_2 + \overline{\kappa_1^* T_1 G_1^{*8}} + \overline{\kappa_1^* T_1^9 \Phi_9^{26}} + \overline{\kappa_1^* G_1^{*8} \Phi_9^{26}}$ $c_0 = \kappa_0^* U_4 + \overline{\kappa_0^* U_3} + \overline{\kappa_0^* U_1 \Phi_9^{26}} + \overline{\kappa_0^* T_0^9 \Phi_9^{26}}$.

16. The apparatus according to claim 14 wherein there is a computation of overflow from the carries by:

$OF = X_8 \overline{X_9} X_{10} + \overline{X_8 X_6} G_1^{*8} + \overline{X_8 X_9} \Phi_9^{26} + X_8 X_{10} \overline{\Phi_9^{26}}$ where $X_1 = \overline{\alpha_0 \forall \gamma_0}$ -continued $X_2 = (\alpha_0 \ \gamma_0)$ $X_3 = \Omega_{3to1}\beta_0 X_2$ $X_4 = \overline{\lambda_1}\lambda_{cc1} + \lambda_{cc1}\overline{\nu}$ $\quad = \overline{\lambda_1}\lambda_{cc1} + \lambda_{cc1}\overline{(\Omega_4\sigma_0 + L_0)}$ $\quad = \overline{\lambda_1}\lambda_{cc1} + \lambda_{cc1}\overline{\Omega_4 L_0} + \lambda_{cc1}\overline{\sigma_0 L_0}$ $X_5 = \overline{\lambda_{cc1}\nu}$ $\quad = \overline{\lambda_{cc1}}\Omega_4\sigma_0 + \overline{\lambda_{cc1}}L_0$ $X_6 = \lambda_1\nu T_1 + \overline{\lambda_1\nu}T_1$ $X_7 = X_3 \ (X_4 + \lambda_1 X_5)$ $\quad = \overline{X_3}X_4 + \overline{X_3}\lambda_1 X_5 + X_3\overline{X_4}\lambda_1 + X_3\overline{X_4 X_5}$ $X_8 = X_1\kappa_1 \forall X_7$ $\quad = X_1\kappa_1\overline{X_7} + \overline{X_1}X_7 + \overline{\kappa_1}X_7$ $X_9 = T_2{}^9 X_6$ $X_{10} = \overline{X_6} + \overline{G_1^{*2}T_2{}^3} + \overline{G_1^{*2}G_3^{*8}}$.

17. The apparatus according to claim 14 wherein there is a calculation in five stages of overflow from the carries by:

STAGE 1

$X_1 = \overline{\alpha_0 \forall \gamma_0}$ $X_2 = (\alpha_0 \forall \gamma_0)$

STAGE 2

$X_3 = \Omega_{3to1}\beta_0 X_2$ $X_4 = \overline{\lambda_1}\lambda_{cc1} + \lambda_{cc1}\overline{\nu}$ $\quad = \overline{\lambda_1}\lambda_{cc1} + \lambda_{cc1}\overline{(\Omega_4\sigma_0 + L_0)}$ $\quad = \overline{\lambda_1}\lambda_{cc1} + \lambda_{cc1}\overline{\Omega_4 L_0} + \lambda_{cc1}\overline{\sigma_0 L_0}$ $X_5 = \overline{\lambda_{cc1}\nu}$ $\quad = \overline{\lambda_{cc1}}\Omega_4\sigma_0 + \overline{\lambda_{cc1}}L_0$

STAGE 3

$X_6 = \lambda_1\nu T_1 + \overline{\lambda_1\nu}T_1$ $X_7 = X_3 \forall (X_4 + \lambda_1 X_5)$ $\quad = \overline{X_3}X_4 + \overline{X_3}\lambda_1 X_5 + X_3\overline{X_4}\lambda_1 + X_3\overline{X_4 X_5}$

STAGE 4

$X_8 = X_1\kappa_1 \forall X_7$ $\quad = X_1\kappa_1\overline{X_7} + \overline{X_1}X_7 + \overline{\kappa_1}X_7$ $X_9 = T_2{}^9 X_6$ $X_{10} = \overline{X_6} + \overline{G_1^{*2}T_2{}^3} + \overline{G_1^{*2}G_3^{*8}}$.

and where a calculation of $\kappa_1$ occurs in Stage 3, and where with the above values, OF is calculated in the fifth stage as:

STAGE 5

$OF = X_8\overline{X_9}X_{10} + \overline{X_8}X_6 G_1^{*8} + \overline{X_8}X_9\Phi_9{}^{26} + X_8\overline{X_{10}\Phi_9{}^{26}}$.

18. An ALU status determination apparatus comprising:

a three-to-one ALU means for executing plural instructions including a three-to-one binary adder including a carry save adder (CSA) and a 2-1 adder having operands denoted as A, B, and Γ; and a logical operation block means for feeding said 2-1 adder; and said 2-1 adder having two of three possible inputs and having a set and suppress means for selecting two of the three inputs as the input for the operand by setting or suppressing the operand; and zero means for predicting a result equal zero outcome in the execution of an instruction by said three-to-one ALU means; and wherein said zero means predicts operations by:

$$\begin{array}{c} A_0 A_1 \ldots A_{31} \\ B_0{}^* B_1{}^* \ldots B_{31}{}^* \\ \Gamma_0{}^* \Gamma_1{}^* \ldots \Gamma_{31}{}^* \\ \hline \sigma_0 \sigma_1 \ldots \sigma_{31} \\ \lambda_0 \lambda_1 \lambda_2 \ldots \tau_2. \\ \underline{1\ 1\ 1 \ldots 1} \\ P_{x0} P_{x1} \ldots P_{x30} P_{x31} \\ P_{y0} P_{y1} P_{y2} \ldots P_{y31}\ \tau_1 \\ \underline{0\ 0\ 0 \ldots 0\quad 1} \\ X\ S_0\ S_1 \ldots S_{30}\ S_{31}. \end{array}$$

representing the computation of $A+B^*+\Gamma^*+\tau_2+\tau_1+1-1$, to compute the worse case scenario of addition subtractions in arithmetic followed by arithmetic operations, said operations being expressed by $A+B+\Gamma$ $A+B+(\Gamma+1)$ $A+(\overline{B}+1)+\Gamma$ $A+(\overline{B}+1)+(\Gamma+1)$ or, $A+B+\Gamma$ $A+B+\Gamma+1$ $A+\overline{B}+1+\Gamma$ $A+\overline{B}+1+\Gamma+1$.

19. The apparatus according to claim 18 wherein to compute the result equal zero for claim 18 three operands are provided to the three-to-one binary adder, and said logical operation block means has operands set or suppressed in order to compute properly an arithmetic operation followed by an arithmetic operation and a logical operation followed by an arithmetic operation.

20. The apparatus according to claim 18 wherein said zero means of said apparatus operates in parallel with the CSA, the 2-1 adder and the logical block means and predicts the result equal zero outcome.

21. The apparatus of claim 18 wherein either an operand itself or the one's complement of that operand is used in the execution of the three-to-one ALU instruction as required by the operation being performed.

22. An ALU status determination apparatus, comprising:
a three-to-one ALU means for executing plural instructions including a three-to-one binary adder including a carry save adder (CSA) and a 2-1 adder having operands denoted as A, B, and $\Gamma$; and
a logical operation block means for feeding said 2-1 adder; and
said 2-1 adder having two of three possible inputs and having a set and suppress means for selecting two of the three inputs as the input for the operand by setting or suppressing the operand; and
zero means for predicting a result equal zero outcome in the execution of an instruction by said three-to-one ALU means; and
wherein the result equal zero is computed by:

$$R_{=0} = (P_{x0} \; P_{y1})(P_{x1} \; P_{y2}) \ldots (P_{x30} \; P_{y31})(P_{x31} \; \tau_1).$$

where:

$$\sigma_i = \alpha_i \; \beta_i \; \gamma_i$$

$$\lambda_i = \alpha_i\beta_i + \alpha_i\gamma_i + \beta_i\gamma_i$$

$$L_i = A_i\Omega_{OALASL} + \Gamma_i\Omega_{OALASL} + A_i\Gamma_i\Omega_{XAAL} + A_i\Gamma_i\Omega_{XOSL}$$

$$P_{xi} = \sigma_i \; (\lambda_{i+1} + L_i) \; 1$$

$$0 \leq i \leq 30$$

$$P_{x31} = \sigma_{31} \; (\tau_2 + L_{31}) \; 1$$

$$P_{yi} = \sigma_i(\lambda_{i+1} + L_i) + \sigma_i(1) + (\lambda_{i+1} + L_i)(1)$$

$$0 \leq i \leq 30$$

$$P_{y31} = \sigma_{31}(\tau_2 + L_{31}) + \sigma_{31}(1) + (\tau_2 + L_{31})(1).$$

23. An ALU status determination apparatus, comprising:
a three-to-one ALU means for executing plural instructions including a three-to-one binary adder including a carry save adder (CSA) and a 2-1 adder having operands denoted as A, B, and $\Gamma$;
a logical operation block means for feeding said 2-1 adder;
said 2-1 adder having two of three possible inputs and having a set and suppress means for selecting two of the three inputs as the input for the operand by setting or suppressing the operand; and
zero means for predicting a result equal zero outcome in the execution of an instruction by said three-to-one ALU means; and
wherein the result equal zero is computed in five logic stages by:

STAGE 1

$$\sigma_i = \alpha_i \; \beta_i \; \gamma_i$$

$$\lambda_i = \alpha_i\beta_i + \alpha_i\gamma_i + \beta_i\gamma_i$$

-continued
$$L_i = A_i\Omega_{OALASL} + \Gamma_i\Omega_{OALASL} + A_i\Gamma_i\Omega_{XAAL} + A_i\Gamma_i\Omega_{XOSL}$$

STAGE 2

$$P_{xi} = \sigma_i(\lambda_{i+1} + L_i) + \sigma_i(\lambda_{i+1} + L_i)$$

$$0 \leq i \leq 30$$

$$P_{xi} = \sigma_i\lambda_{i+1} + \sigma_i L_i + \sigma_i\lambda_{i+1}L_i$$

$$0 \leq i \leq 30$$

and $$P_{x31} = \sigma_{31}(\tau_2 + L_{31}) + \sigma_{31}(\tau_2 + L_{31})$$

$$P_{x31} = \sigma_{31}\tau_2 + \sigma_{31}L_{31} + \sigma_{31}\tau_2 L_{31}$$

STAGE 3

$$R_{=0}(i) = P_{xi} \; P_{yi+1}$$

$$0 \leq i \leq 30$$

$$R_{=0}(31) = P_{x31} \; \tau_1.$$

STAGE 4

$$R_{=0}(0:7) = R_{=0}(0)R_{=0}(1) \ldots R_{=0}(7)$$

$$R_{=0}(8:15) = R_{=0}(8)R_{=0}(9) \ldots R_{=0}(15)$$

$$R_{=0}(16:23) = R_{=0}(16)R_{=0}(17) \ldots R_{=0}(23)$$

$$R_{=0}(24:31) = R_{=0}(24)R_{=0}(25) \ldots R_{=0}(31)$$

STAGE 5

$$R_{=0} = R_{=0}(0:7)R_{=0}(8:15)R_{=0}(16:23)R_{=0}(24:31).$$

24. An ALU status determination apparatus, comprising:
a three-to-one ALU means for executing plural instructions including a three-to-one binary adder including a carry save adder (CSA) and a 2-1 adder having operands denoted as A, B, and $\Gamma$; and
a logical operation block means for feeding said 2-1 adder; and
zero means for predicting a result equal zero outcome in the execution of an instruction by said three-to-one ALU means; and wherein
A and $\Gamma$ are equal to zero for the CSA when computing a logical followed by arithmetic operation and wherein one of two inputs of the 2-1 adder has the carry of the CSA suppressed allowing the result of the logical operation to pass through and having the inputs of the CSA equal to the operands for arithmetic followed by arithmetic when one of the inputs in the 2-1 adder has suppressed a logical operand and allowed a carry of the CSA to pass through; and
wherein said logical block means is in parallel with said three-to-one binary adder and computes the following:
representing the computation of $A + B^* + \Gamma^* + \tau_2 + \tau_1 + 1 - 1$, to compute the worse case scenario of addition subtractions in arithmetic followed by arithmetic operations as those operations are expressed by

A+B+Γ

A+B+(Γ+1)

A+(B̄+1)+Γ

A+(B̄+1)+(Γ+1)

or,

A+B+Γ

A+B+Γ+1

A+B̄+1+Γ

A+B̄+1+Γ+1.

* * * * *